US012030589B1

(12) United States Patent
Sano et al.

(10) Patent No.: US 12,030,589 B1
(45) Date of Patent: Jul. 9, 2024

(54) ELECTRIC DEVICE AND ELECTRIC SYSTEM OF HUMAN-POWERED VEHICLE

(71) Applicant: SHIMANO INC., Sakai (JP)

(72) Inventors: Toru Sano, Sakai (JP); Tomohiro Takimoto, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/470,383

(22) Filed: Sep. 19, 2023

(51) Int. Cl.
  *B62M 9/122* (2010.01)
  *B62J 45/20* (2020.01)
  *B62J 45/40* (2020.01)

(52) U.S. Cl.
  CPC ............ *B62M 9/122* (2013.01); *B62J 45/20* (2020.02); *B62J 45/40* (2020.02)

(58) Field of Classification Search
  CPC .................. B62M 9/122; B62J 45/40
  See application file for complete search history.

(56) References Cited

U.S. PATENT DOCUMENTS

| | | | |
|---|---|---|---|
| 8,721,495 B2 | 5/2014 | Kitamura et al. | |
| 10,392,078 B2 | 8/2019 | Jordan et al. | |
| 10,828,532 B2 * | 11/2020 | Izuru | A63B 69/16 |
| 2003/0001357 A1 | 1/2003 | Fujii et al. | |
| 2003/0197427 A1 * | 10/2003 | Oohara | B62J 6/01 307/64 |
| 2009/0240858 A1 * | 9/2009 | Takebayashi | H04L 12/403 710/110 |
| 2018/0257737 A1 * | 9/2018 | Komatsu | B62K 25/10 |
| 2020/0187279 A1 * | 6/2020 | Suzuki | H04W 76/14 |

FOREIGN PATENT DOCUMENTS

JP        3573723 B2    1/2003

* cited by examiner

*Primary Examiner* — Edwin A Young
(74) *Attorney, Agent, or Firm* — MORI & WARD, LLP

(57) ABSTRACT

An electric device comprises first communicator circuitry and first electronic controller circuitry. The first communicator circuitry is configured to receive a signal from second communicator circuitry of a second electric device. The first electronic controller circuitry is configured to change a state of the first communicator circuitry from a first state to a second state based on a first output of a first sensor configured to sense a first sensor object. The first state has first power consumption. The second state has second power consumption. The first power consumption is lower than the second power consumption. The first electronic controller circuitry is configured to change the state of the first communicator circuitry from the second state to the first state based on a second output of a second sensor configured to sense a second sensor object different from the first sensor object.

20 Claims, 17 Drawing Sheets

ELECTRIC DEVICE AND ELECTRIC SYSTEM OF HUMAN-POWERED VEHICLE

BACKGROUND

Technical Field

The present invention relates to an electric device and a control system of a human-powered vehicle.

Background Information

A human-powered vehicle includes an electric unit configured to be powered by an electric power supply. One of objects of the present disclosure is to improve electric power saving of such an electric unit or a system including the electric unit.

SUMMARY

In accordance with a first aspect of the present invention, an electric device of a human-powered vehicle comprises first communicator circuitry and first electronic controller circuitry. The first communicator circuitry is configured to receive a signal from second communicator circuitry of a second electric device. The first electronic controller circuitry is configured to change a state of the first communicator circuitry from a first state to a second state based on a first output of a first sensor configured to sense a first sensor object. The first state has first power consumption. The second state has second power consumption. The first power consumption is lower than the second power consumption. The first electronic controller circuitry is configured to change the state of the first communicator circuitry from the second state to the first state based on a second output of a second sensor configured to sense a second sensor object different from the first sensor object.

With the electric device according to the first aspect, the first electronic controller circuitry is configured to change the state of the first communicator circuitry from the first state to the second state based on the first output of the first sensor while the first electronic controller circuitry is configured to change the state of the first communicator circuitry from the second state to the first state based on the second output of the second sensor. Thus, it is possible to improve flexibility of controlling the state of the first communicator circuitry compared with a case where the first electronic controller circuitry changes the state of the first communicator circuitry based on only one of the first output and the second output. Thus, it is possible to efficiently improve electric power saving of the electric device.

In accordance with a second aspect of the present invention, the electric device according to the first aspect is configured so that the first electronic controller circuitry is configured to change the state of the first communicator circuitry from the first state to the second state based on the first output relating to a traveling state of the human-powered vehicle.

With the electric device according to the second aspect, it is possible to efficiently improve electric power saving of the electric device depending on the traveling state of the human-powered vehicle.

In accordance with a third aspect of the present invention, the electric device according to the first or second aspect is configured so that the first electronic controller circuitry is configured to change the state of the first communicator circuitry from the second state to the first state based on the second output relating to the traveling state of the human-powered vehicle.

With the electric device according to the third aspect, it is possible to more efficiently improve electric power saving of the electric device based on the traveling state of the human-powered vehicle.

In accordance with a fourth aspect of the present invention, the electric device according to any one of the first to third aspects is configured so that the first electronic controller circuitry is configured to change the state of the first communicator circuitry from the first state to the second state based on the first output relating to one of: vibration of the human-powered vehicle; pedaling torque of a crank of the human-powered vehicle; cadence of the human-powered vehicle; and a speed of the human-powered vehicle.

With the electric device according to the fourth aspect, it is possible to more efficiently improve electric power saving of the electric device based on one of: the vibration of the human-powered vehicle; the pedaling torque of a crank of the human-powered vehicle; the cadence of the human-powered vehicle; and the speed of the human-powered vehicle.

In accordance with a fifth aspect of the present invention, the electric device according to the fourth aspect is configured so that the first electronic controller circuitry is configured to change the state of the first communicator circuitry from the second state to the first state based on the second output relating to another of: the vibration of the human-powered vehicle; the pedaling torque of the crank of the human-powered vehicle; the cadence of the human-powered vehicle; and the speed of the human-powered vehicle.

With the electric device according to the fifth aspect, it is possible to more efficiently improve electric power saving of the electric device based on another of: the vibration of the human-powered vehicle; the pedaling torque of a crank of the human-powered vehicle; the cadence of the human-powered vehicle; and the speed of the human-powered vehicle.

In accordance with a sixth aspect of the present invention, the electric device according to any one of the first to fifth aspects is configured so that the first electronic controller circuitry is configured to change the state of the first communicator circuitry from the first state to the second state in a case where the first output is greater than a first threshold.

With the electric device according to the sixth aspect, it is possible to more efficiently improve electric power saving of the electric device based on the first output.

In accordance with a seventh aspect of the present invention, the electric device according to any one of the first to sixth aspects is configured so that the first electronic controller circuitry is configured to change the state of the first communicator circuitry from the second state to the first state in a case where the second output is less than a second threshold.

With the electric device according to the seventh aspect, it is possible to more efficiently improve electric power saving of the electric device based on the second output.

In accordance with an eighth aspect of the present invention, the electric device according to the seventh aspect is configured so that the first electronic controller circuitry is configured to change the state of the first communicator circuitry from the second state to the first state in a case where the second output is less than the second threshold for a second determination time.

With the electric device according to the eighth aspect, it is possible to more efficiently improve electric power saving of the electric device based on the second output.

In accordance with a ninth aspect of the present invention, the electric device according to any one of the first to eighth aspects is configured so that the first communicator circuitry is configured to monitor, at a first interval in the first state, the signal transmitted from the second communicator circuitry of the second electric device.

With the electric device according to the ninth aspect, it is possible to more efficiently improve electric power saving of the electric device in the first state while monitoring the signal.

In accordance with a tenth aspect of the present invention, the electric device according to the ninth aspect is configured so that the first communicator circuitry is configured to monitor, at a second interval in the second state, the signal transmitted from the second communicator circuitry of the second electric device. The second interval is shorter than the first interval.

With the electric device according to the tenth aspect, it is possible to more efficiently improve electric power saving of the electric device in the second state while monitoring the signal.

In accordance with an eleventh aspect of the present invention, the electric device according to the ninth aspect is configured so that the first communicator circuitry is configured to continuously monitor in the second state, the signal transmitted from the second communicator circuitry of the second electric device.

With the electric device according to the eleventh aspect, it is possible to reliably detect the signal transmitted from the second communicator circuitry.

In accordance with a twelfth aspect of the present invention, the electric device according to any one of the first to eleventh aspects further comprises an electric actuator configured to generate an actuation force. The first electronic controller circuitry is configured to control the electric actuator to generate the actuation force in a case where the first communicator circuitry detects the signal in the second state.

With the electric device according to the twelfth aspect, it is possible to utilize the actuation force of the electric actuator in the second state.

In accordance with a thirteenth aspect of the present invention, the electric device according to any one of the first to twelfth aspects is configured so that the first electronic controller circuitry is configured to change the state of the first communicator circuitry from the first state to the second state in a case where the first communicator circuitry detects the signal in the first state.

With the electric device according to the thirteenth aspect, it is possible to change the state of the first communicator circuitry based on the signal in the first state. Thus, it is possible to improve usability of the electric device while efficiently improving electric power saving of the electric device.

In accordance with a fourteenth aspect of the present invention, the electric device according to any one of the first to thirteenth aspects is configured so that the first electronic controller circuitry is configured to receive electricity from an electric power generator configured to generate electricity.

With the electric device according to the fourteenth aspect, it is possible to more efficiently improve electric power saving of the electric device using the electricity generated by the electric power generator.

In accordance with a fifteenth aspect of the present invention, the electric device according to any one of the first to fourteenth aspects is configured so that the first electronic controller circuitry is configured to receive electricity from an electric power storage configured to store electricity.

With the electric device according to the fifteenth aspect, it is possible to more efficiently improve electric power saving of the electric device using the electricity stored by the electric power storage.

In accordance with a sixteenth aspect of the present invention, the electric device according to any one of the first to fifteenth aspects is configured so that the first electronic controller circuitry is configured to be electrically connected to an additional electronic controller circuitry. The first electronic controller circuitry is configured to change the state of the first communicator circuitry based on a command generated by the additional electronic controller circuitry.

With the electric device according to the sixteenth aspect, it is possible to reliably change the state of the first communicator circuitry using the command generated by the additional electronic controller circuitry.

In accordance with a seventeenth aspect of the present invention, the electric device according to the sixteenth aspect is configured so that the additional electronic controller circuitry is configured to generate a first command in response to the first output of the first sensor. The first electronic controller circuitry is configured to change the state of the first communicator circuitry from the first state to the second state in response to the first command. The additional electronic controller circuitry is configured to generate a second command in response to the second output of the second sensor. The first electronic controller circuitry is configured to change the state of the first communicator circuitry from the second state to the first state in response to the second command.

With the electric device according to the seventeenth aspect, it is possible to reliably change the state of the first communicator circuitry using the first command and the second command generated by the additional electronic controller circuitry.

In accordance with an eighteenth aspect of the present invention, an electric system of a human-powered vehicle comprises the electric device according to any one of the first to seventeenth aspects and the additional electric device. The additional electric device is configured to be electrically connected to the first electronic controller circuitry of the electric device. The first electronic controller circuitry is configured to change the state of the first communicator circuitry based on a command generated by the additional electric device.

With the electric system according to the eighteenth aspect, it is possible to more efficiently improve electric power saving of the electric system using the electric device and the additional electric device.

In accordance with a nineteenth aspect of the present invention, the electric system according to the eighteenth aspect further comprises the first sensor and the second sensor.

With the electric system according to the first aspect, it is possible to more efficiently improve electric power saving of the electric system using the electric device, the additional electric device, the first sensor, and the second sensor.

In accordance with a twentieth aspect of the present invention, the electric system according to the eighteenth or nineteenth aspect is configured so that the additional electric device is separately provided from the electric device. The first electronic controller circuitry is configured to be electrically connected to the additional electric device via an electric cable.

With the electric device according to the twentieth aspect, it is possible to improve flexibility of arrangement of the electric device and the additional electric device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
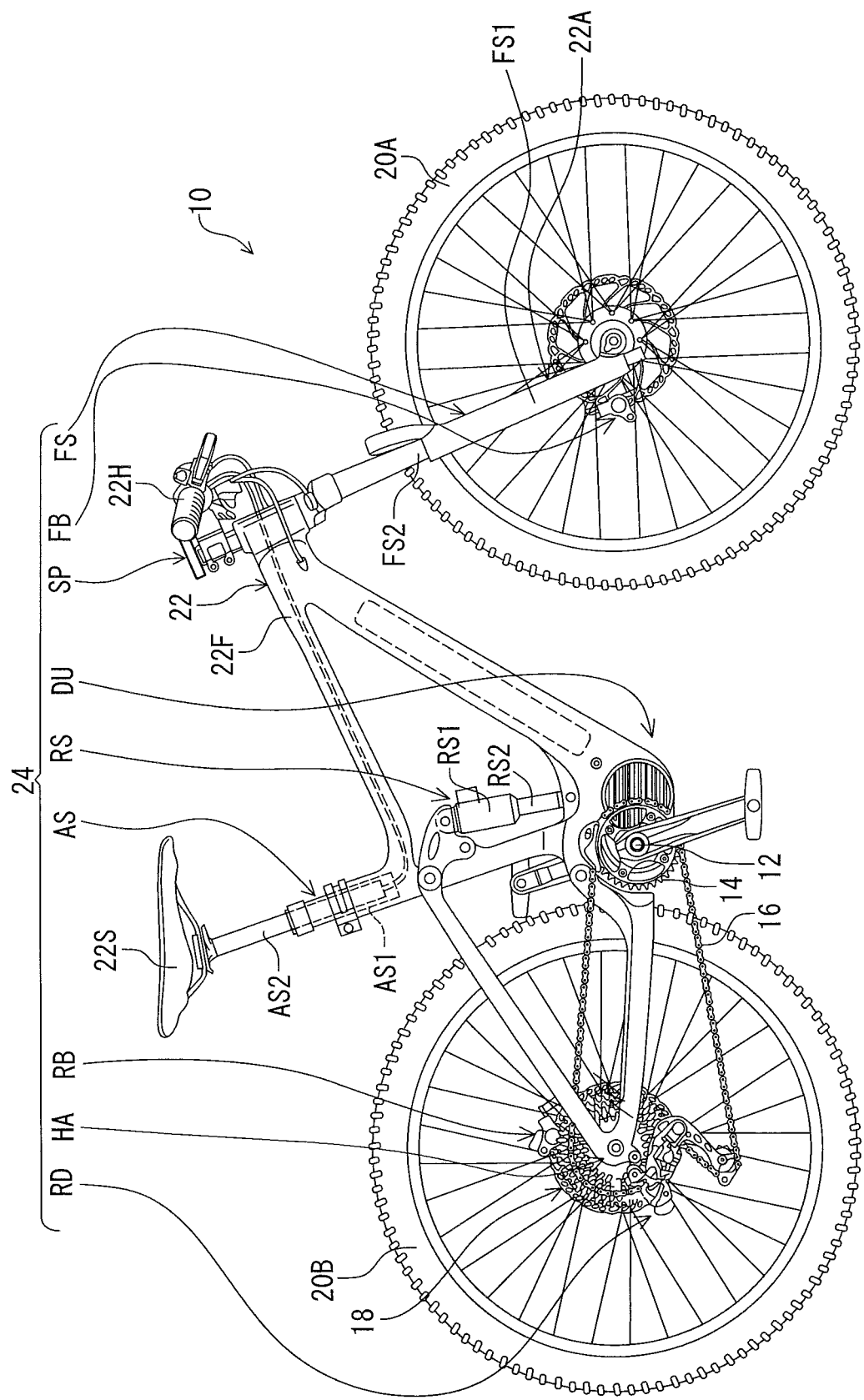
FIG. 1 is a side elevational view of a human-powered vehicle including a control system in accordance with one of embodiments.

The embodiments will now be described with reference to the accompanying drawings, wherein like reference numerals designate corresponding or identical elements throughout the various drawings.

As seen in FIG. 1, a human-powered vehicle 10 includes a crank 12, a sprocket 14, a chain 16, a sprocket assembly 18, a wheel 20A, a wheel 20B, and a vehicle body 22. The vehicle body 22 includes, for example, a frame 22F, a handlebar 22H, a front fork 22A, and a saddle 22S. The crank 12 is rotatably coupled to the vehicle body 22. The crank 12 is rotatable relative to the vehicle body 22 during pedaling. The sprocket 14 is coupled to the crank 12. The sprocket assembly 18 is rotatably coupled to the vehicle body 22. The chain 16 is engaged with the sprocket 14 and the sprocket assembly 18. The sprocket assembly 18 is coupled to the wheel 20A to transmit a pedaling force from the crank 12 to the wheel 20A via the sprocket 14 and the chain 16. The sprocket 14 can include at least two sprockets if needed or desired.

As seen in FIG. 1, the human-powered vehicle 10 includes an electric system 24. The electric system 24 of the human-powered vehicle 10 comprises an electric device FS. The electric device FS is configured to be mounted to the vehicle body 22 of the human-powered vehicle 10.

The electric device FS includes a suspension. The electric device FS is configured to absorb shocks or vibrations generated by riding on rough terrain. The electric device FS is installed in the front fork 22A. The electric device FS is configured to absorb shocks or vibrations transmitted from the wheel 20A. The electric device FS includes a first longitudinal member FS1 and a second longitudinal member FS2. The first longitudinal member FS1 and the second longitudinal member FS2 are relatively movable.

Figure 2:
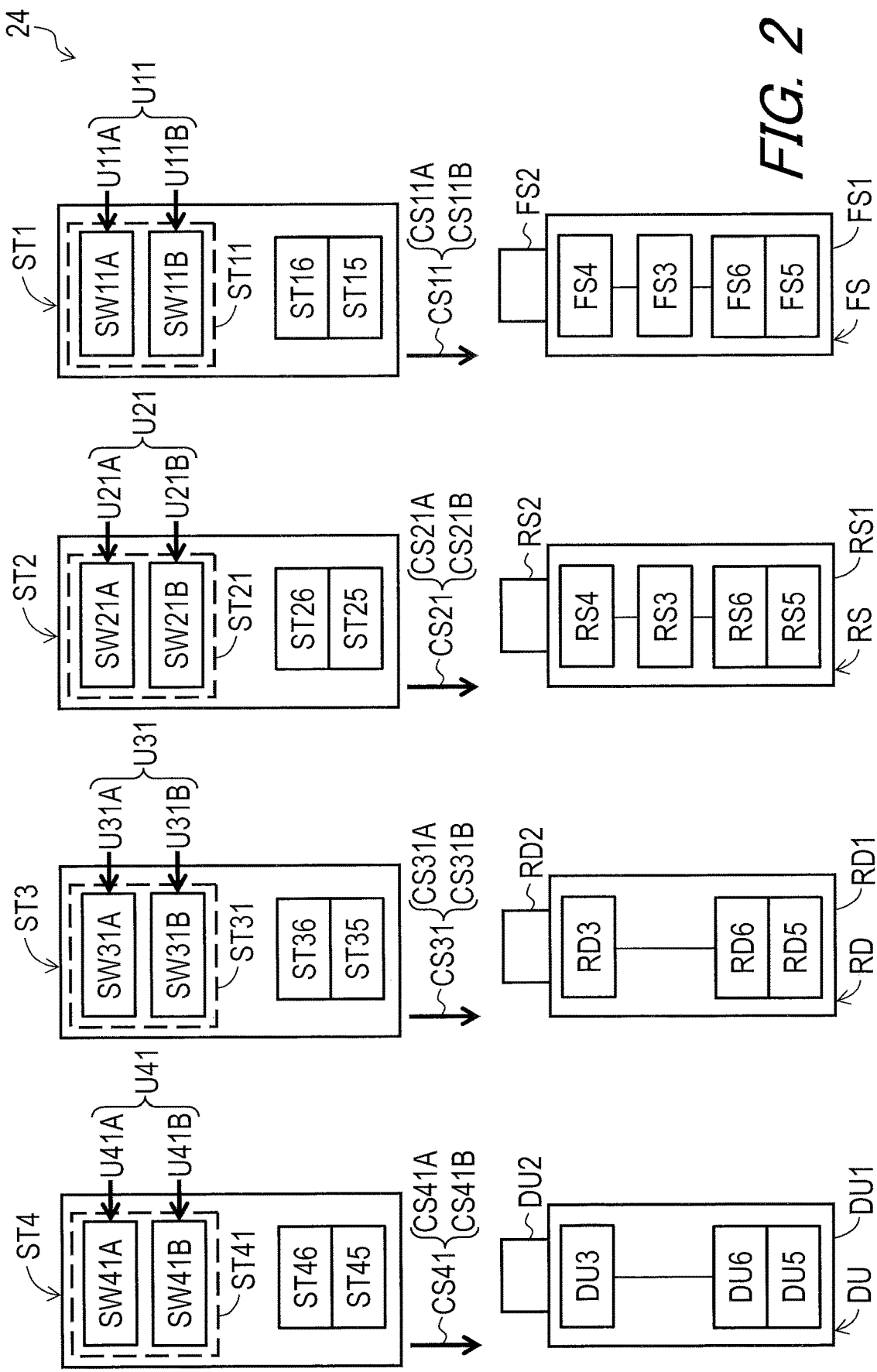
FIG. 2 is a schematic block diagram of the control system of the human-powered vehicle illustrated in FIG. 1.

As seen in FIG. 2, the electric device FS of the human-powered vehicle 10 comprises an electric actuator FS3. The electric actuator FS3 is configured to generate an actuation force. Examples of the electric actuator FS3 include an electric motor.

The electric device FS includes a state changing structure FS4 configured to change the state of the electric device FS between a first state and a second state. The electric actuator FS3 is configured to actuate the state changing structure FS4 to change the state of the electric device FS between the first state and the second state. For example, the state changing structure FS4 includes a valve unit.

For example, the state changing structure FS4 is configured to allow the first longitudinal member FS1 and the second longitudinal member FS2 to relatively move in the first state. The state changing structure FS4 is configured to restrict the first longitudinal member FS1 and the second longitudinal member FS2 from relatively moving in the second state.

The electric device FS comprises an electric power source FS5 and a power source holder FS6. The electric power source FS5 is configured to supply electricity to the electric actuator FS3. The power source holder FS6 is configured to detachably and reattachably hold the electric power source FS5. The electric power source FS5 is configured to be detachably and reattachably attached to the power source holder FS6. The power source holder FS6 is configured to be electrically connected to the electric actuator FS3. The electric power source FS5 is configured to supply electricity to the electric actuator FS3 via the power source holder FS6. Examples of the electric power source FS5 includes a primary battery and a secondary battery. In a case where electricity is supplied to the electric device FS from another power supply such as an electric power generator, the electric power source FS5 can be detached from the power source holder FS6 and a dummy battery can be attached to the power source holder FS6, or a connection between the power source holder FS6 and the electric actuator FS3 can be interrupted by removing an electric cable configured to connect the power source holder FS6 and the electric actuator FS3.

As seen in FIG. 1, the electric system 24 of the human-powered vehicle 10 comprises an electric device RS. The electric device RS is configured to be mounted to the vehicle body 22 of the human-powered vehicle 10.

The electric device RS includes a suspension. The electric device RS is configured to absorb shocks or vibrations generated by riding on rough terrain. The electric device RS is configured to absorb shocks or vibrations transmitted from the wheel 20B. The electric device RS includes a first longitudinal member RS1 and a second longitudinal member RS2. The first longitudinal member RS1 and the second longitudinal member RS2 are relatively movable.

As seen in FIG. 2, the electric device RS of the human-powered vehicle 10 comprises an electric actuator RS3. The electric actuator RS3 is configured to generate an actuation force. Examples of the electric actuator RS3 include an electric motor.

The electric device RS includes a state changing structure RS4 configured to change the state of the electric device RS between a first state and a second state. The electric actuator RS3 is configured to actuate the state changing structure RS4 to change the state of the electric device RS between the first state and the second state. For example, the state changing structure RS4 includes a valve unit.

The state changing structure RS4 is configured to allow the first longitudinal member RS1 and the second longitudinal member RS2 to relatively move in the first state. The state changing structure RS4 is configured to restrict the first longitudinal member RS1 and the second longitudinal member RS2 from relatively moving in the second state.

The electric device RS comprises an electric power source RS5 and a power source holder RS6. The electric power source RS5 is configured to supply electricity to the electric actuator RS3. The power source holder RS6 is configured to detachably and reattachably hold the electric power source RS5. The electric power source RS5 is configured to be detachably and reattachably attached to the power source holder RS6. The power source holder RS6 is configured to be electrically connected to the electric actuator RS3. The electric power source RS5 is configured to supply electricity to the electric actuator RS3 via the power source holder RS6. Examples of the electric power source RS5 includes a primary battery and a secondary battery. In a case where electricity is supplied to the electric device RS from another power supply such as an electric power generator, the electric power source RS5 can be detached from the power source holder RS6 and a dummy battery can be attached to the power source holder RS6, or a connection between the power source holder RS6 and the electric actuator RS3 can be interrupted by removing an electric cable configured to connect the power source holder RS6 and the electric actuator RS3.

As seen in FIG. 1, the electric system 24 of the human-powered vehicle 10 comprises an electric device RD. The electric device RD is configured to be mounted to the vehicle body 22 of the human-powered vehicle 10.

The electric device RD includes a gear changer. The electric device RD is configured to change a gear ratio of the human-powered vehicle 10. The gear ratio is a ratio of a rotational speed of the sprocket assembly 18 to a rotational speed of the sprocket 14. The electric device RD is configured to shift the chain 16 relative to the sprocket assembly 18. In the present embodiment, the electric device RD includes a rear derailleur. However, the electric device RD can include another type of gear changer if needed or desired. Examples of another type of gear changer include a front derailleur and an internal-gear hub.

Figure 3:
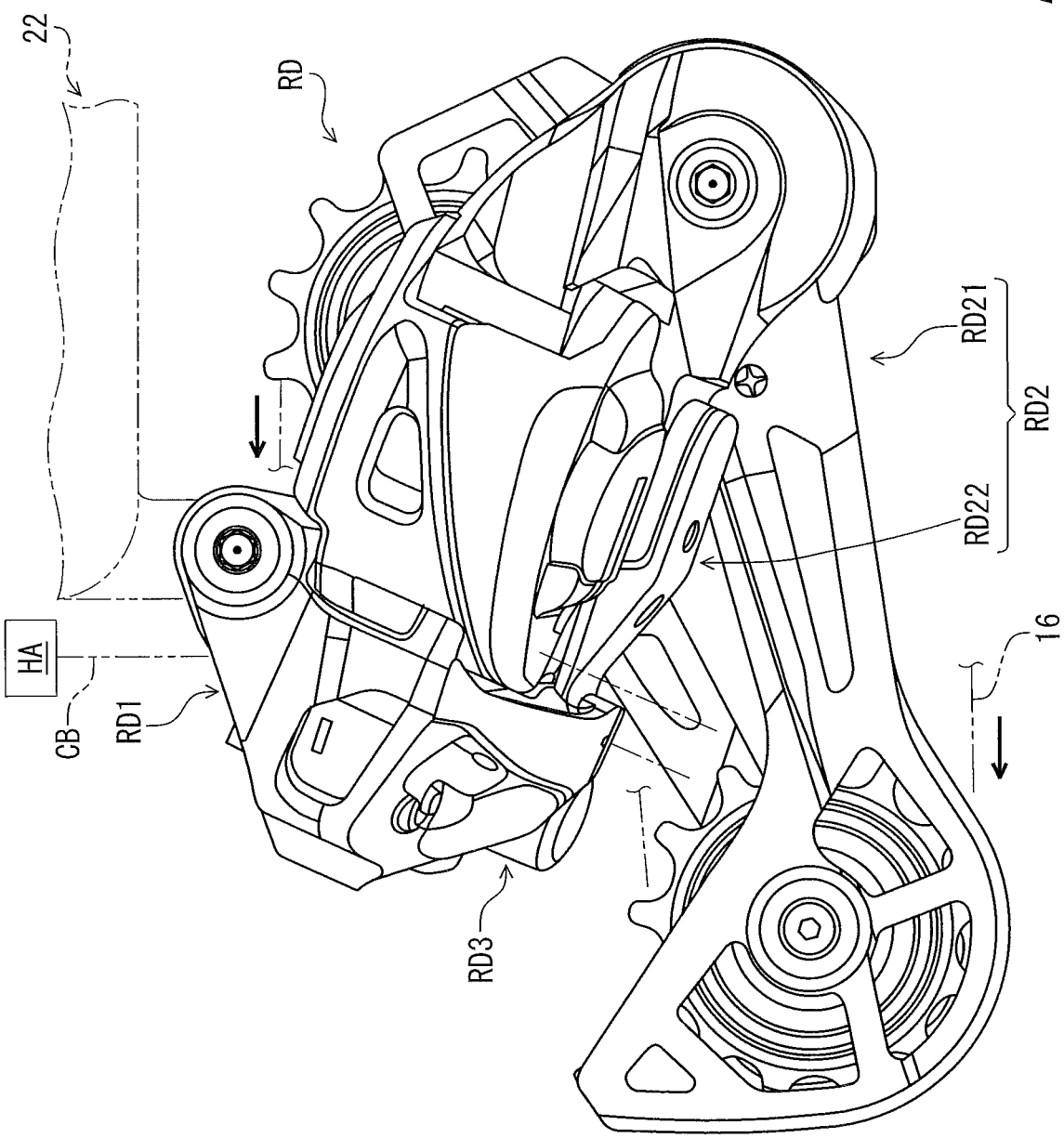
FIG. 3 is a side elevational view of an electric device in accordance with one of embodiments.

As seen in FIG. 3, the electric device RD further comprises a base member RD1 and a movable member RD2. The base member RD1 is mountable to the vehicle body 22 of the human-powered vehicle 10. The movable member RD2 is movable relative to the base member RD1. For example, the movable member RD2 includes a chain guide RD21 and a linkage RD22. The chain guide RD21 is contactable with the chain 16. The linkage RD22 movably couples the base member RD1 and the chain guide RD21.

The electric device RD of the human-powered vehicle 10 comprises an electric actuator RD3. The electric actuator RD3 is configured to generate an actuation force. Examples of the electric actuator RD3 include an electric motor. The electric actuator RD3 is coupled to at least one of the base member RD1 and the movable member RD2 to move the movable member RD2 relative to the base member RD1. The electric actuator RD3 is at least partially provided to at least one of the base member RD1 and the movable member RD2.

The electric device RD comprises an electric power source RD5 and a power source holder RD6. The electric power source RD5 is configured to supply electricity to the electric actuator RD3. The power source holder RD6 is configured to detachably and reattachably hold the electric power source RD5. The electric power source RD5 is configured to be detachably and reattachably attached to the power source holder RD6. The power source holder RD6 is configured to be electrically connected to the electric actuator RD3. The electric power source RD5 is configured to supply electricity to the electric actuator RD3 via the power source holder RD6. Examples of the electric power source RD5 includes a primary battery and a secondary battery. In a case where electricity is supplied to the electric device RD from another power supply such as an electric power generator, the electric power source RD5 can be detached from the power source holder RD6 and a dummy battery can be attached to the power source holder RD6, or a connection between the power source holder RD6 and the electric actuator RD3 can be interrupted by removing an electric cable configured to connect the power source holder RD6 and the electric actuator RD3.

As seen in FIG. 1, the electric system 24 of the human-powered vehicle 10 comprises an electric device DU. The electric device DU is configured to be mounted to the vehicle body 22 of the human-powered vehicle 10.

The electric device DU includes an assist driving unit. The electric device DU is configured to assist propulsion of the human-powered vehicle 10. The electric device DU is configured to change an assist ratio depending on a human power applied to the human-powered vehicle 10.

As seen in FIG. 2, the electric device DU of the human-powered vehicle 10 comprises an electric actuator DU3. The electric actuator DU3 is configured to generate an actuation force. Examples of the electric actuator DU3 include an electric motor. The electric actuator DU3 is configured to apply the actuation force to the human-powered vehicle 10 to assist propulsion of the human-powered vehicle 10.

The electric device DU comprises an electric power source DU5 and a power source holder DU6. The electric power source DU5 is configured to supply electricity to the electric actuator DU3. The power source holder DU6 is configured to detachably and reattachably hold the electric power source DU5. The electric power source DU5 is configured to be detachably and reattachably attached to the power source holder DU6. The power source holder DU6 is configured to be electrically connected to the electric actuator DU3. The electric power source DU5 is configured to supply electricity to the electric actuator DU3 via the power source holder DU6. Examples of the electric power source DU5 includes a primary battery and a secondary battery. In a case where electricity is supplied to the electric device DU from another power supply such as an electric power generator, the electric power source DU5 can be detached from the power source holder DU6 and a dummy battery can be attached to the power source holder DU6, or a connection between the power source holder DU6 and the electric actuator DU3 can be interrupted by removing an electric cable configured to connect the power source holder DU6 and the electric actuator DU3.

As seen in FIG. 1, the electric system 24 of the human-powered vehicle 10 comprises an electric device FB. The electric device FB is configured to be mounted to the vehicle body 22 of the human-powered vehicle 10.

The electric device FB includes a braking device. The electric device FB is configured to apply a braking force to the human-powered vehicle 10. The electric device FB is configured to apply a braking force to the wheel 20A.

Figure 4:
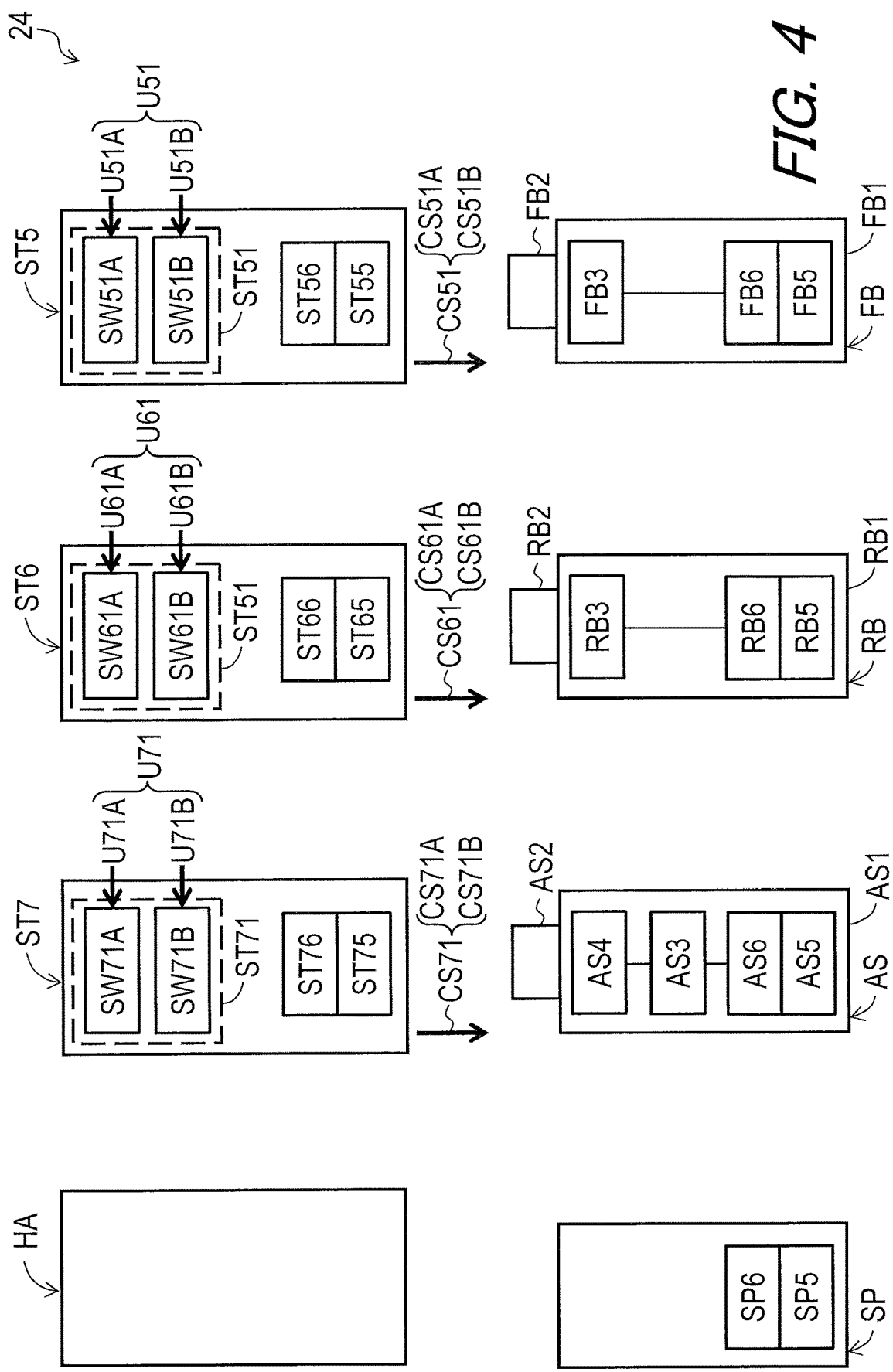
FIG. 4 is a schematic block diagram of the control system of the human-powered vehicle illustrated in FIG. 1.

As seen in FIG. 4, the electric device FB further comprises a base member FB1 and a movable member FB2. The base member FB1 is mountable to the vehicle body 22 of the human-powered vehicle 10. The movable member FB2 is movable relative to the base member FB1. For example, the movable member FB2 includes a brake pad. The movable member FB2 is slidably contactable with the wheel 20A. The electric device FB of the human-powered vehicle 10 comprises an electric actuator FB3. The electric actuator FB3 is configured to generate an actuation force. Examples of the electric actuator FB3 include an electric motor. The electric actuator FB3 is configured to move the movable member FB2 relative to the base member FB1. The electric actuator FB3 is configured to apply the actuation force to the human-powered vehicle 10 as the braking force via the movable member FB2.

The electric device FB comprises an electric power source FB5 and a power source holder FB6. The electric power source FB5 is configured to supply electricity to the electric actuator FB3. The power source holder FB6 is configured to detachably and reattachably hold the electric power source FB5. The electric power source FB5 is configured to be detachably and reattachably attached to the power source holder FB6. The power source holder FB6 is configured to be electrically connected to the electric actuator FB3. The electric power source FB5 is configured to supply electricity to the electric actuator FB3 via the power source holder FB6. Examples of the electric power source FB5 includes a primary battery and a secondary battery. In a case where electricity is supplied to the electric device FB from another power supply such as an electric power generator, the electric power source FB5 can be detached from the power source holder FB6 and a dummy battery can be attached to the power source holder FB6, or a connection between the power source holder FB6 and the electric actuator FB3 can be interrupted by removing an electric cable configured to connect the power source holder FB6 and the electric actuator FB3.

As seen in FIG. 1, the electric system 24 of the human-powered vehicle 10 comprises an electric device RB. The electric device RB is configured to be mounted to the vehicle body 22 of the human-powered vehicle 10.

The electric device RB includes a braking device. The electric device RB is configured to apply a braking force to the human-powered vehicle 10. The electric device RB is configured to apply a braking force to the wheel 20B.

As seen in FIG. 4, the electric device RB further comprises a base member RB1 and a movable member RB2. The base member RB1 is mountable to the vehicle body 22 of the human-powered vehicle 10. The movable member RB2 is movable relative to the base member RB1. For example, the movable member RB2 includes a brake pad. The movable member RB2 is slidably contactable with the wheel 20A. The electric device RB of the human-powered vehicle 10 comprises an electric actuator RB3. The electric actuator RB3 is configured to generate an actuation force. Examples of the electric actuator RB3 include an electric motor. The electric actuator RB3 is configured to move the movable member RB2 relative to the base member RB1. The electric actuator RB3 is configured to apply the actuation force to the human-powered vehicle 10 as the braking force via the movable member RB2.

The electric device RB comprises an electric power source RB5 and a power source holder RB6. The electric power source RB5 is configured to supply electricity to the electric actuator RB3. The power source holder RB6 is configured to detachably and reattachably hold the electric power source RB5. The electric power source RB5 is configured to be detachably and reattachably attached to the power source holder RB6. The power source holder RB6 is configured to be electrically connected to the electric actuator RB3. The electric power source RB5 is configured to supply electricity to the electric actuator RB3 via the power source holder RB6. Examples of the electric power source RB5 includes a primary battery and a secondary battery. In a case where electricity is supplied to the electric device RB from another power supply such as an electric power generator, the electric power source RB5 can be detached from the power source holder RB6 and a dummy battery can be attached to the power source holder RB6, or a connection between the power source holder RB6 and the electric actuator RB3 can be interrupted by removing an electric cable configured to connect the power source holder RB6 and the electric actuator RB3.

As seen in FIG. 1, the electric system 24 of the human-powered vehicle 10 comprises an electric device AS. The electric device AS is configured to be mounted to the vehicle body 22 of the human-powered vehicle 10.

The electric device AS includes an adjustable seatpost. The electric device AS is configured to change a height of the saddle 22S relative to the frame 22F. The electric device AS has an adjustable state and a locked state. The electric device AS allows the user to change the height of the saddle 22S in the adjustable state. The electric device AS is locked to maintain the height of the saddle 22S in the locked state. The electric device AS is configured to change the state of the electric device AS between the adjustable state and the locked state. The electric device AS includes a first longitudinal member AS1 and a second longitudinal member AS2. The first longitudinal member AS1 and the second longitudinal member AS2 are relatively movable.

As seen in FIG. 4, the electric device AS of the human-powered vehicle 10 comprises an electric actuator AS3. The electric actuator AS3 is configured to generate an actuation force. Examples of the electric actuator AS3 include an electric motor. The actuation force changes the state of the electric device AS between the first state and the second state.

The electric device AS includes a state changing structure AS4 configured to change the state of the electric device AS between the adjustable state and the locked state. The electric actuator AS3 is configured to actuate the state changing structure AS4 to change the state of the electric device AS between the adjustable state and the locked state. For example, the state changing structure AS4 includes a valve unit.

The state changing structure AS4 is configured to allow the first longitudinal member AS1 and the second longitudinal member AS2 to relatively move in the adjustable state. The state changing structure AS4 is configured to restrict the first longitudinal member AS1 and the second longitudinal member AS2 from relatively moving in the locked state.

The electric device AS comprises an electric power source AS5 and a power source holder AS6. The electric power source AS5 is configured to supply electricity to the electric actuator AS3. The power source holder AS6 is configured to detachably and reattachably hold the electric power source AS5. The electric power source AS5 is configured to be detachably and reattachably attached to the power source holder AS6. The power source holder AS6 is configured to be electrically connected to the electric actuator AS3. The electric power source AS5 is configured to supply electricity to the electric actuator AS3 via the power source holder AS6. Examples of the electric power source AS5 includes a primary battery and a secondary battery. In a case where electricity is supplied to the electric device AS from another power supply such as an electric power generator, the electric power source AS5 can be detached from the power source holder AS6 and a dummy battery can be attached to the power source holder AS6, or a connection between the power source holder AS6 and the electric actuator AS3 can be interrupted by removing an electric cable configured to connect the power source holder AS6 and the electric actuator AS3.

As seen in FIG. 1, the electric system 24 of the human-powered vehicle 10 comprises an electric device HA. The electric device HA is configured to be mounted to the vehicle body 22 of the human-powered vehicle 10. The electric device HA includes a hub assembly. The electric device HA rotatably couples the wheel 20B and the vehicle body 22.

Figure 5:
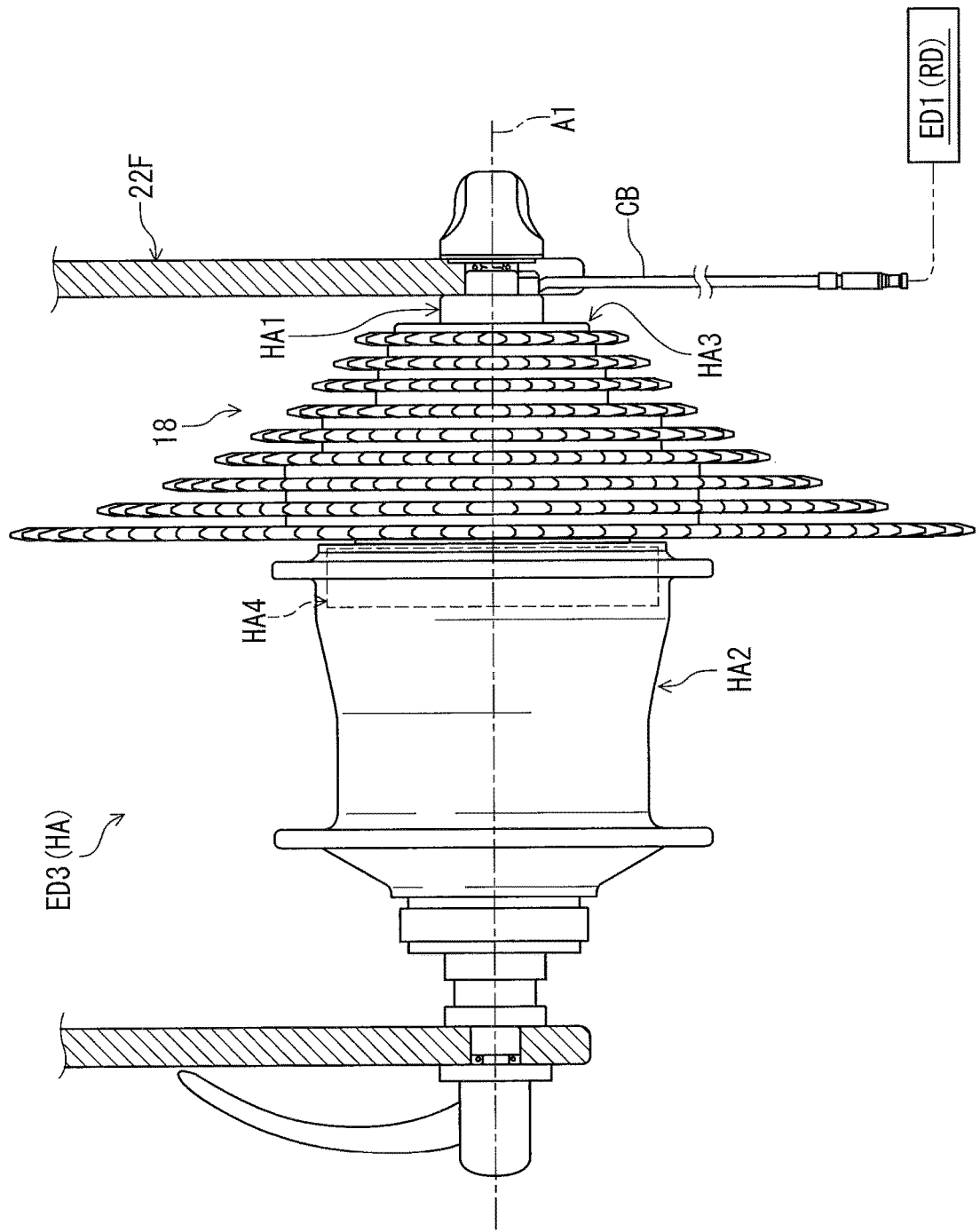
FIG. 5 is a side elevational view of an additional electric device in accordance with one of embodiments.

As seen in FIG. 5, the electric device HA includes a hub axle HAL a hub shell HA2, a sprocket support body HA3, and a rachet structure HA4. The hub axle HA1 is secured to the vehicle body 22. The hub shell HA2 is rotatably supported by the hub axle HA1 about a rotational axis A1. The sprocket support body HA3 is rotatably supported by the hub axle HA1 about the rotational axis A1. The sprocket assembly 18 is mounted on the sprocket support body HA3. The rachet structure HA4 is configured to transmit rotation of the sprocket support body HA3 to the hub shell HA2 in one rotational direction during pedaling. The rachet structure HA4 is configured to allow the sprocket support body HA3 to rotate relative to the hub shell HA2 in an opposite rotational direction of the one rotational direction during coasting.

As seen in FIG. 4, the electric system 24 of the human-powered vehicle 10 comprises an electric device SP. The electric device SP is configured to be mounted to the vehicle body 22 of the human-powered vehicle 10. For example, the electric device SP includes at least one of a smartphone and a cycle computer. The electric device SP is configured to display information relating to the human-powered vehicle 10. However, the electric device SP can include structures other than the smartphone and the cycle computer if needed or desired. The electric device SP can also be referred to as an external device SP or a display device SP.

The electric device SP comprises an electric power source SP5 and a third power source holder SP6. The third power source holder SP6 is configured to detachably and reattachably hold the electric power source SP5. The electric power source SP5 is configured to be detachably and reattachably attached to the third power source holder SP6. Examples of the electric power source SP5 includes a primary battery and a secondary battery.

The human-powered vehicle 10 can include another electric device other than the electric devices FS, RS, RD, DU, FB, RB, AS, HA, and SP if needed or desired. At least one of the electric devices FS, RS, RD, DU, FB, RB, AS, HA, and SP can be omitted from the human-powered vehicle 10 if needed or desired.

As seen in FIG. 2, the electric system 24 of the human-powered vehicle 10 comprises an electric device ST1. The electric device ST1 is configured to be mounted to the vehicle body 22 (see e.g., FIG. 1) of the human-powered vehicle 10. The electric device ST1 is configured to operate the electric device FS. The electric device ST1 can be mounted to parts other than the handlebar 22H (see e.g., FIG. 1) if needed or desired. The electric device ST1 can also be referred to as an operating device ST1.

The electric device ST1 of the human-powered vehicle 10 comprises a user interface ST11. The user interface ST11 is configured to receive a user input Ulf. The user input U11 includes at least one of user inputs U11A and U11B. For example, the user interface ST11 includes an electric switch SW11A configured to be activated by the user input U11A. The user interface ST11 includes an electric switch SW11B configured to be activated by the user input U11B. The user input U11A includes a press of the electric switch SW11A. The user input U11B includes a press of the electric switch SW11B. The user interface ST11 can include structures other than the electric switch SW11A or SW11B if needed or desired. One of the electric switches SW11A and SW11B can be omitted from the user interface ST11 if needed or desired.

The user input U11 includes concurrent receipts of the user inputs U11A and U11B. The user input U11 includes concurrent presses of the electric switches SW11A and SW11B. The user input U11 includes a normal press, a long press, or multiple presses of the electric switch SW11A. The user input U11 includes a normal press, a long press, or multiple presses of the electric switch SW11B.

The electric device ST1 is configured to operate the electric device FS in response to the user input Ulf. The electric device ST1 is configured to generate a control signal CS11 in response to the user input U11. The electric device ST1 is configured to generate a control signal CS11A in response to the user input U11A. The electric device ST1 is configured to generate a control signal CS11B in response to the user input U11B.

The electric device FS has a first state and a second state. For example, the electric device FS is configured to absorb shocks or vibrations generated by riding on rough terrain in the first state. The electric device FS is configured to be free of absorbing shocks or vibrations generated by riding on rough terrain in the second state. The electric device FS can be configured to have a first stroke in the first state while the electric device FS can be configured to have a second stroke different from the first stroke in the second state. The electric device FS can be configured to have a first damper performance in the first state while the electric device FS can be configured to have a second damper performance different from the first damper performance in the second state. The electric device FS is configured to change the state of the electric device FS between the first state and the second state in response to the control signal CS11. The electric device FS is configured to change the state of the electric device FS between the first state and the second state in response to the control signal CS11A or CA11B. The control signal CS11 indicates changing of the state of the electric device FS. The control signal CS11A or CA11B indicates changing of the state of the electric device FS.

The electric device ST1 comprises an electric power source ST15 and a power source holder ST16. The power source holder ST16 is configured to detachably and reattachably hold the electric power source ST15. The electric power source ST15 is configured to be detachably and reattachably attached to the power source holder ST16. Examples of the electric power source ST15 includes a primary battery and a secondary battery.

As seen in FIG. 2, the electric system 24 of the human-powered vehicle 10 comprises an electric device ST2. The electric device ST2 is configured to be mounted to the vehicle body 22 (see e.g., FIG. 1) of the human-powered vehicle 10. The electric device ST2 is configured to operate the electric device RS. The electric device ST2 can be mounted to parts other than the handlebar 22H (see e.g., FIG. 1) if needed or desired. The electric device ST2 can also be referred to as an operating device ST2.

The electric device ST2 of the human-powered vehicle 10 comprises a user interface ST21. The user interface ST21 is configured to receive a user input U21. The user input U21 includes at least one of user inputs U21A and U21B. For example, the user interface ST21 includes an electric switch SW21A configured to be activated by the user input U21A. The user interface ST21 includes an electric switch SW21B configured to be activated by the user input U21B. The user input U21A includes a press of the electric switch SW21A. The user input U21B includes a press of the electric switch SW21B. The user interface ST21 can include structures other than the electric switch SW21A or SW21B if needed or desired. One of the electric switches SW21A and SW21B can be omitted from the user interface ST21 if needed or desired.

The user input U21 includes concurrent receipts of the user inputs U21A and U21B. The user input U21 includes concurrent presses of the electric switches SW21A and SW21B. The user input U21 includes a normal press, a long press, or multiple presses of the electric switch SW21A. The user input U21 includes a normal press, a long press, or multiple presses of the electric switch SW21B.

The electric device ST2 is configured to operate the electric device RS in response to the user input U21. The electric device ST2 is configured to generate a control signal CS21 in response to the user input U21. The electric device ST2 is configured to generate a control signal CS21A in response to the user input U21A. The electric device ST2 is configured to generate a control signal CS21B in response to the user input U21B.

The electric device RS has a first state and a second state. For example, the electric device RS is configured to absorb shocks or vibrations generated by riding on rough terrain in the first state. The electric device RS is configured to be free of absorbing shocks or vibrations generated by riding on rough terrain in the second state. The electric device RS can be configured to have a first stroke in the first state while the electric device RS can be configured to have a second stroke different from the first stroke in the second state. The electric device RS can be configured to have a first damper performance in the first state while the electric device RS can be configured to have a second damper performance different from the first damper performance in the second state. The electric device RS is configured to change the state of the electric device RS between the first state and the second state in response to the control signal CS21. The electric device RS is configured to change the state of the electric device RS between the first state and the second state in response to the control signal CS21A or CS21B. The control signal CS21 indicates changing of the state of the electric device RS. The control signal CS21A or CA21B indicates changing of the state of the electric device RS.

The electric device ST2 comprises an electric power source ST25 and a power source holder ST26. The power source holder ST26 is configured to detachably and reattachably hold the electric power source ST25. The electric power source ST25 is configured to be detachably and reattachably attached to the power source holder ST26. Examples of the electric power source ST25 includes a primary battery and a secondary battery.

As seen in FIG. 2, the electric system 24 of the human-powered vehicle 10 comprises an electric device ST3. The electric device ST3 is configured to be mounted to the vehicle body 22 (see e.g., FIG. 1) of the human-powered vehicle 10. The electric device ST3 is configured to operate the electric device RD. The electric device ST3 can be mounted to parts other than the handlebar 22H (see e.g., FIG. 1) if needed or desired. The electric device ST3 can also be referred to as an operating device ST3.

The electric device ST3 of the human-powered vehicle 10 comprises a user interface ST31. The user interface ST31 is configured to receive a user input U31. The user input U31 includes at least one of user inputs U31A and U31B. For example, the user interface ST31 includes an electric switch SW31A configured to be activated by the user input U31A. The user interface ST31 includes an electric switch SW31B configured to be activated by the user input U31B. The user input U31A includes a press of the electric switch SW31A. The user input U31B includes a press of the electric switch SW31B. The user interface ST31 can include structures other than the electric switch SW31A or SW31B if needed or desired. One of the electric switches SW31A and SW31B can be omitted from the user interface ST31 if needed or desired.

The user input U31 includes concurrent receipts of the user inputs U31A and U31B. The user input U31 includes concurrent presses of the electric switches SW31A and SW31B. The user input U31 includes a normal press, a long press, or multiple presses of the electric switch SW31A. The user input U31 includes a normal press, a long press, or multiple presses of the electric switch SW31B.

The electric device ST3 is configured to operate the electric device RD in response to the user input U31. The electric device ST3 is configured to generate a control signal CS31 in response to the user input U31. The electric device ST3 is configured to generate a control signal CS31A in response to the user input U31A. The electric device ST3 is configured to generate a control signal CS31B in response to the user input U31B.

The electric device RD is configured to change the gear ratio in response to the control signal CS31. The electric device RD is configured to change the gear ratio in response to the control signal CS31A or CS31B. For example, the control signal CS31A indicates one of upshifting and downshifting of the electric device RD. The control signal CS31B indicates the other of upshifting and downshifting of the electric device RD.

The electric device ST3 comprises an electric power source ST35 and a power source holder ST36. The power source holder ST36 is configured to detachably and reattachably hold the electric power source ST35. The electric power source ST35 is configured to be detachably and reattachably attached to the power source holder ST36. Examples of the electric power source ST35 includes a primary battery and a secondary battery.

As seen in FIG. 2, the electric system 24 of the human-powered vehicle 10 comprises an electric device ST4. The electric device ST4 is configured to be mounted to the vehicle body 22 (see e.g., FIG. 1) of the human-powered vehicle 10. The electric device ST4 is configured to operate the electric device FS. The electric device ST4 can be mounted to parts other than the handlebar 22H (see e.g., FIG. 1) if needed or desired. The electric device ST4 can also be referred to as an operating device ST4.

The electric device ST4 of the human-powered vehicle 10 comprises a user interface ST41. The user interface ST41 is configured to receive a user input U41. The user input U41 includes at least one of user inputs U41A and U41B. For example, the user interface ST41 includes an electric switch SW41A configured to be activated by the user input U41A. The user interface ST41 includes an electric switch SW41B configured to be activated by the user input U41B. The user input U41A includes a press of the electric switch SW41A. The user input U41B includes a press of the electric switch SW41B. The user interface ST41 can include structures other than the electric switch SW41A or SW41B if needed or desired. One of the electric switches SW41A and SW41B can be omitted from the user interface ST41 if needed or desired.

The user input U41 includes concurrent receipts of the user inputs U41A and U41B. The user input U41 includes concurrent presses of the electric switches SW41A and SW41B. The user input U41 includes a normal press, a long press, or multiple presses of the electric switch SW41A. The user input U41 includes a normal press, a long press, or multiple presses of the electric switch SW41B.

The electric device ST4 is configured to operate the electric device DU in response to the user input U41. The electric device ST4 is configured to generate a control signal CS41 in response to the user input U41. The electric device ST4 is configured to generate a control signal CS41A in response to the user input U41A. The electric device ST4 is configured to generate a control signal CS41B in response to the user input U41B. The electric device DU is configured to change the assist ratio which is a ratio of the assist driving force to the human power applied to the human-powered vehicle 10 in response to the control signal CS41. The electric device DU is configured to change the assist ratio which is a ratio of the assist driving force to the human power applied to the human-powered vehicle 10 in response to the control signal CS41A or CS41B. The electric device DU includes at least two assist ratios. The electric device DU is configured to change the assist ratio between the at least two assist ratios in response to the control signal CS41. The electric device DU is configured to change the assist ratio between the at least two assist ratios in response to the control signal CS41A or CA41B.

The electric device ST4 comprises an electric power source ST45 and a power source holder ST46. The power source holder ST46 is configured to detachably and reattachably hold the electric power source ST45. The electric power source ST45 is configured to be detachably and reattachably attached to the power source holder ST46. Examples of the electric power source ST45 includes a primary battery and a secondary battery.

As seen in FIG. 4, the electric system 24 of the human-powered vehicle 10 comprises an electric device ST5. The electric device ST5 is configured to be mounted to the vehicle body 22 (see e.g., FIG. 1) of the human-powered vehicle 10. The electric device ST5 is configured to operate the electric device FS. The electric device ST5 can be mounted to parts other than the handlebar 22H (see e.g., FIG. 1) if needed or desired. The electric device ST5 can also be referred to as an operating device ST5.

The electric device ST5 of the human-powered vehicle 10 comprises a user interface ST51. The user interface ST51 is configured to receive a user input U51. The user input U51 includes at least one of user inputs U51A and U51B. For example, the user interface ST51 includes an electric switch SW51A configured to be activated by the user input U51A. The user interface ST51 includes an electric switch SW51B configured to be activated by the user input U51B. The user input U51A includes a press of the electric switch SW51A. The user input U51B includes a press of the electric switch SW51B. The user interface ST51 can include structures other than the electric switch SW51A or SW51B if needed or desired. One of the electric switches SW51A and SW51B can be omitted from the user interface ST51 if needed or desired.

The user input U51 includes concurrent receipts of the user inputs U51A and U51B. The user input U51 includes concurrent presses of the electric switches SW51A and SW51B. The user input U51 includes a normal press, a long press, or multiple presses of the electric switch SW51A. The user input U51 includes a normal press, a long press, or multiple presses of the electric switch SW51B.

The electric device ST5 is configured to operate the electric device FB in response to the user input U51. The electric device ST5 is configured to generate a control signal CS51 in response to the user input U51. The electric device ST5 is configured to generate a control signal CS51A in response to the user input U51A. The electric device ST5 is configured to generate a control signal CS51B in response to the user input U51B. The electric device FB is configured to apply the braking force to the human-powered vehicle 10 in response to the control signal CS51. The electric device FB is configured to apply the braking force to the human-powered vehicle 10 in response to the control signal CS51A or CS51B.

The electric device ST5 comprises an electric power source ST55 and a power source holder ST56. The power source holder ST56 is configured to detachably and reattachably hold the electric power source ST55. The electric power source ST55 is configured to be detachably and reattachably attached to the power source holder ST56. Examples of the electric power source ST55 includes a primary battery and a secondary battery.

As seen in FIG. 4, the electric system 24 of the human-powered vehicle 10 comprises an electric device ST6. The electric device ST6 is configured to be mounted to the vehicle body 22 (see e.g., FIG. 1) of the human-powered vehicle 10. The electric device ST6 is configured to operate the electric device RB. The electric device ST6 can be mounted to parts other than the handlebar 22H (see e.g., FIG. 1) if needed or desired. The electric device ST6 can also be referred to as an operating device ST6.

The electric device ST6 of the human-powered vehicle 10 comprises a user interface ST61. The user interface ST61 is configured to receive a user input U61. The user input U61 includes at least one of user inputs U61A and U61B. For example, the user interface ST61 includes an electric switch SW61A configured to be activated by the user input U61A. The user interface ST61 includes an electric switch SW61B configured to be activated by the user input U61B. The user input U61A includes a press of the electric switch SW61A. The user input U61B includes a press of the electric switch SW61B. The user interface ST61 can include structures other than the electric switch SW61A or SW61B if needed or desired. One of the electric switches SW61A and SW61B can be omitted from the user interface ST61 if needed or desired.

The user input U61 includes concurrent receipts of the user inputs U61A and U61B. The user input U61 includes concurrent presses of the electric switches SW61A and SW61B. The user input U61 includes a normal press, a long press, or multiple presses of the electric switch SW61A. The user input U61 includes a normal press, a long press, or multiple presses of the electric switch SW61B.

The electric device ST6 is configured to operate the electric device RB in response to the user input U61. The electric device ST6 is configured to generate a control signal CS61 in response to the user input U61. The electric device ST6 is configured to generate a control signal CS61A in response to the user input U61A. The electric device ST6 is configured to generate a control signal CS61B in response to the user input U61B. The electric device RB is configured to apply the braking force to the human-powered vehicle 10 in response to the control signal CS61. The electric device RB is configured to apply the braking force to the human-powered vehicle 10 in response to the control signal CS61A or CS61B.

The electric device ST6 comprises an electric power source ST65 and a power source holder ST66. The power source holder ST66 is configured to detachably and reattachably hold the electric power source ST65. The electric power source ST65 is configured to be detachably and reattachably attached to the power source holder ST66. Examples of the electric power source ST65 includes a primary battery and a secondary battery.

As seen in FIG. 4, the electric system 24 of the human-powered vehicle 10 comprises an electric device ST7. The electric device ST7 is configured to be mounted to the vehicle body 22 (see e.g., FIG. 1) of the human-powered vehicle 10. The electric device ST7 is configured to operate the electric device AS. The electric device ST7 can be mounted to parts other than the handlebar 22H (see e.g., FIG. 1) if needed or desired. The electric device ST7 can also be referred to as an operating device ST7.

The electric device ST7 of the human-powered vehicle 10 comprises a user interface ST71. The user interface ST71 is configured to receive a user input U71. The user input U71 includes at least one of user inputs U71A and U71B. For example, the user interface ST71 includes an electric switch SW71A configured to be activated by the user input U71A. The user interface ST71 includes an electric switch SW71B configured to be activated by the user input U71B. The user input U71A includes a press of the electric switch SW71A. The user input U71B includes a press of the electric switch SW71B. The user interface ST71 can include structures other than the electric switch SW71A or SW71B if needed or desired. One of the electric switches SW71A and SW71B can be omitted from the user interface ST71 if needed or desired.

The user input U71 includes concurrent receipts of the user inputs U71A and U71B. The user input U71 includes concurrent presses of the electric switches SW71A and SW71B. The user input U71 includes a normal press, a long press, or multiple presses of the electric switch SW71A. The user input U71 includes a normal press, a long press, or multiple presses of the electric switch SW71B.

The electric device ST7 is configured to operate the electric device AS in response to the user input U71. The electric device ST7 is configured to generate a control signal CS7 in response to the user input U71. The electric device ST7 is configured to generate a control signal CS7A in response to the user input U71A. The electric device ST7 is configured to generate a control signal CS7B in response to the user input U71B. The electric device AS is configured to the state of the electric device AS between the adjustable state and the locked state in response to the control signal CS7. The electric device AS is configured to the state of the electric device AS between the adjustable state and the locked state in response to the control signal CS7A. The electric device AS is configured to the state of the electric device AS between the adjustable state and the locked state in response to the control signal CS7B.

The electric device ST7 comprises an electric power source ST75 and a power source holder ST76. The power source holder ST76 is configured to detachably and reattachably hold the electric power source ST75. The electric power source ST75 is configured to be detachably and reattachably attached to the power source holder ST76. Examples of the electric power source ST75 includes a primary battery and a secondary battery.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 10 with facing a handlebar or steering. Examples of the user's standard position include a saddle and a seat. Accordingly, these terms, as utilized to describe the electric devices FS, RS, RD, DU, FB, RB, AS, HA, and SP, the electric devices ST1, ST2, ST3, ST4, ST5, ST6, and ST7, or other devices, should be interpreted relative to the human-powered vehicle 10 equipped with the electric devices FS, RS, RD, DU, FB, RB, AS, HA, and SP, the electric devices ST1, ST2, ST3, ST4, ST5, ST6, and ST7, or other devices as used in an upright riding position on a horizontal surface.

One of the electric devices FS, RS, RD, DU, FB, RB, AS, HA, and SP can also be referred to as an electric device ED1 or a first electric device ED1. One of the electric devices ST1, ST2, ST3, ST4, ST5, ST6, and ST7 can also be referred to as a second electric device ED2. Namely, the electric system 24 of the human-powered vehicle 10 comprises the electric device ED1 and the second electric device ED2. Another of the electric devices FS, RS, RD, DU, FB, RB, AS, HA, and SP can also be referred to as an additional electric device ED3. Namely, the electric system 24 of the human-powered vehicle 10 comprises the electric device ED1 and the additional electric device ED3. One of the electric actuators FS3, RS3, RD3, DU3, FB3, RB3, and AS3 can also be referred to as an electric actuator ED13. Namely, the electric device ED1 further comprises the electric actuator ED13 configured to generate the actuation force.

One of the electric actuators FS3, RS3, RD3, DU3, FB3, RB3, and AS3 can also be referred to as an electric actuator ED13 of the first electric device ED1. One of the electric power sources FS5, RS5, RD5, DU5, FB5, RB5, AS5, and SP5 can also be referred to as an electric power source ED15 of the first electric device ED1. One of the power source holders FS6, RS6, RD6, DU6, FB6, RB6, AS6, and SP6 can also be referred to as a power source holder ED16 of the first electric device ED1.

One of the user interfaces ST11, ST21, ST31, ST41, ST51, ST61, and ST71 can also be referred to as an additional user interface ED28 of the second electric device ED2. One of the user inputs U11, U21, U31, U41, U51, U61, and U71 can also be referred to as an additional user input U2. One of the electric power sources ST15, ST25, ST35, ST45, ST55, ST65, and ST75 can also be referred to as an electric power source ED25 of the second electric device ED2. One of the power source holders ST25, ST25, ST35, ST45, ST55, ST65, and ST75 can also be referred to as a power source holder ED26 of the second electric device ED2.

Figure 6:
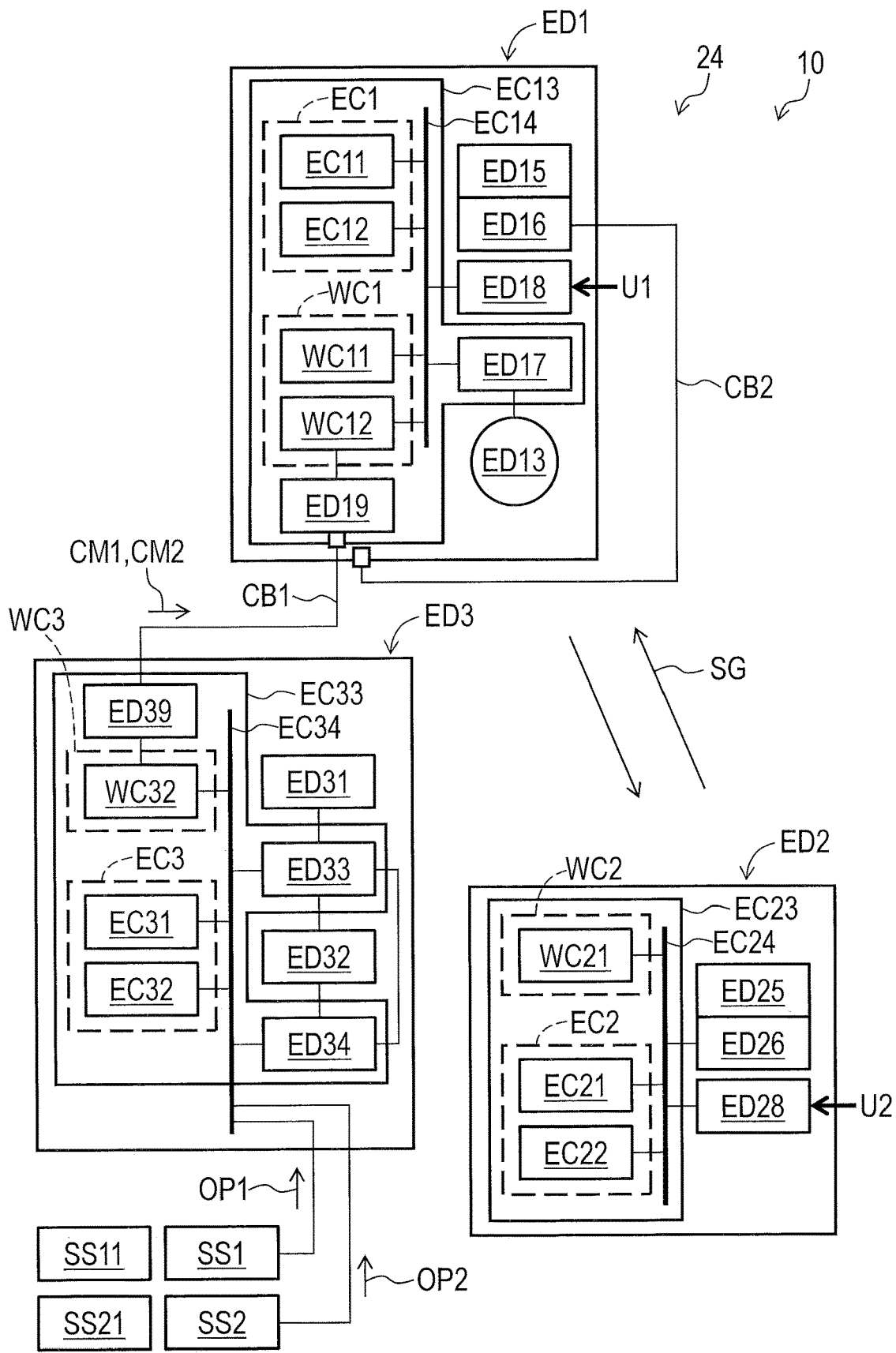
FIG. 6 is a schematic block diagram of the control system of the human-powered vehicle illustrated in FIG. 1.

As seen in FIG. 6, the electric device ED1 of the human-powered vehicle 10 comprises first communicator circuitry WC1. The second electric device ED2 includes second communicator circuitry WC2. The first communicator circuitry WC1 is configured to communicate with another communicator circuitry such as the second communicator circuitry WC2. The second communicator circuitry WC2 is configured to communicate with another communicator circuitry such as the first communicator circuitry WC1. For example, the second communicator circuitry WC2 is configured to transmit a signal. The first communicator circuitry WC1 is configured to receive a signal SG from the second communicator circuitry WC2 of the second electric device ED2.

In the present embodiment, the first communicator circuitry WC1 includes first wireless communicator circuitry WC11. The second communicator circuitry WC2 includes second wireless communicator circuitry WC21. The first wireless communicator circuitry WC11 is configured to wirelessly communicate with another wireless communicator circuitry such as the second wireless communicator circuitry WC21. The second wireless communicator circuitry WC21 is configured to wirelessly communicate with another wireless communicator circuitry such as the first wireless communicator circuitry WC11.

The term "wireless communicator" or "wireless communicator circuitry" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, each of the first wireless communicator circuitry WC11 and the second wireless communicator circuitry WC21 is configured to at least receive a wireless signal. For example, each of the first wireless communicator circuitry WC11 and the second wireless communicator circuitry WC21 includes a two-way wireless transceiver that conducts two-way wireless communications using the wireless receiver for wirelessly receiving signals and a wireless transmitter for wirelessly transmitting signals.

In the present embodiment, the first wireless communicator circuitry WC11 and the second wireless communicator circuitry WC21 can use radio frequency (RF) signals, ultra-wide band communication signals, radio frequency identification (RFID), Wi-Fi (registered trademark), Zigbee (registered trademark), ANT+ (registered trademark), or Bluetooth (registered trademark) or any other type of communication protocols suitable for short range wireless communications as understood in the human-powered vehicle field.

It should also be understood that each of the first wireless communicator circuitry WC11 and the second wireless communicator circuitry WC21 can transmit the signals at a particular or randomly selected frequency and/or with an identifier such as a particular code, to distinguish the wireless control signal from other wireless control signals. In this way, each of the electric device ED1 and the second electric device ED2 can recognize which control signals are to be acted upon and which control signals are not to be acted upon. Thus, each of the electric device ED1 and the second electric device ED2 can ignore the control signals from other wireless communicators of other electric devices.

As seen in FIG. 6, the first wireless communicator circuitry WC11 includes a signal transmitting circuit or circuitry, a signal receiving circuit or circuitry, and an antenna. The first wireless communicator circuitry WC11 is configured to superimpose digital signals on carrier wave using the first communication protocol to wirelessly transmit signals. In the present embodiment, the first wireless communicator circuitry WC11 is configured to encrypt signals using a cryptographic key to generate encrypted wireless signals. The first wireless communicator circuitry WC11 is configured to transmit wireless signals via the antenna.

The first wireless communicator circuitry WC11 is configured to receive wireless signals via the antenna. In the present embodiment, the first wireless communicator circuitry WC11 is configured to decode the wireless signals to recognize signals transmitted from other wireless communicators. The first wireless communicator circuitry WC11 is configured to decrypt the wireless signals using the cryptographic key.

As seen in FIG. 6, the second wireless communicator circuitry WC21 includes a signal transmitting circuit or circuitry, a signal receiving circuit or circuitry, and an antenna. The second wireless communicator circuitry WC21 is configured to superimpose digital signals on carrier wave using the second communication protocol to wirelessly transmit signals. In the present embodiment, the second wireless communicator circuitry WC21 is configured to encrypt signals using a cryptographic key to generate encrypted wireless signals. The second wireless communicator circuitry WC21 is configured to transmit wireless signals via the antenna.

The second wireless communicator circuitry WC21 is configured to receive wireless signals via the antenna. In the present embodiment, the second wireless communicator circuitry WC21 is configured to decode the wireless signals to recognize signals transmitted from other wireless communicators. The second wireless communicator circuitry WC21 is configured to decrypt the wireless signals using the cryptographic key.

As seen in FIG. 6, the electric device ED1 of the human-powered vehicle 10 comprises first electronic controller circuitry EC1. The first electronic controller circuitry EC1 is configured to control the first communicator circuitry WC1 to communicate with another communicator circuitry such as the second communicator circuitry WC2. The first electronic controller circuitry EC1 is configured to control the first wireless communicator circuitry WC11 to wirelessly communicate with another wireless communicator circuitry such as the second wireless communicator circuitry WC21. The first communicator circuitry WC1 is configured to be paired with another communicator such as the second communicator circuitry WC2 through a pairing process. The first wireless communicator circuitry WC11 is configured to be paired with another wireless communicator such as the second wireless communicator circuitry WC21 through a pairing process.

The first electronic controller circuitry EC1 includes a processor EC11. The first electronic controller circuitry EC1 includes a memory EC12. The processor EC11 is coupled to the memory EC12. The memory EC12 is coupled to the processor EC11. The electric device ED1 includes a circuit board EC13 and a system bus EC14. The processor EC11 and the memory EC12 are electrically mounted on the circuit board EC13. The processor EC11 is electrically connected to the memory EC12 via the circuit board EC13 and the system bus EC14. The memory EC12 is electrically connected to the processor EC11 via the circuit board EC13 and the system bus EC14. For example, the first electronic controller circuitry EC1 includes a semiconductor. The processor EC11 includes a semiconductor. The memory EC12 includes a semiconductor. However, the first electronic controller circuitry EC1 can be free of a semiconductor if needed or desired. The processor EC11 can be free of a semiconductor if needed or desired. The memory EC12 can be free of a semiconductor if needed or desired.

For example, the processor EC11 includes at least one of a central processing unit (CPU), a micro processing unit (MPU), and a memory controller. The memory EC12 is electrically connected to the processor EC11. For example, the memory EC12 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC12 includes storage areas each having an address. The processor EC11 is configured to control the memory EC12 to store data in the storage areas of the memory EC12 and reads data from the storage areas of the memory EC12. The processor EC11 can also be referred to as a hardware processor EC11 or a processor circuit or circuitry EC11. The memory EC12 can also be referred to as a hardware memory EC12 or a memory circuit or circuitry EC12. The memory EC12 can also be referred to as a computer-readable storage medium EC12.

The first electronic controller circuitry EC1 is configured to execute at least one control algorithm of the electric device ED1. For example, the first electronic controller circuitry EC1 is programed to execute at least one control algorithm of the electric device ED1. The memory EC12 stores at least one program including at least one program instruction. The at least one program is read into the processor EC11, and thereby the at least one control algorithm of the electric device ED1 is executed based on the at least one program.

The structure of the first electronic controller circuitry EC1 is not limited to the above structure. The structure of the first electronic controller circuitry EC1 is not limited to the above structure. The structure of the first electronic controller circuitry EC1 is not limited to the processor EC11 and the memory EC12. The first electronic controller circuitry EC1 can be realized by hardware alone or a combination of hardware and software. In the present embodiment, the processor EC11 and the memory EC12 are integrated as a single chip such as an application specific integrated circuit (ASIC) or a field programmable gate array (FPGA). However, the processor EC11 and the memory EC12 can be separate chips if needed or desired. The first electronic controller circuitry EC1 can include the processor EC11, the memory EC12, the circuit board EC13, and the system bus EC14 if needed or desired. The first electronic controller circuitry EC1 can be at least two electronic controllers which are separately provided.

The first electronic controller circuitry EC1 can include at least two electronic controllers which are separately provided. The at least one control algorithm of the electric device ED1 can be executed by the at least two electronic controllers if needed or desired. The first electronic controller circuitry EC1 can include at least two hardware processors which are separately provided. The first electronic controller circuitry EC1 can include at least two hardware memories which are separately provided. The at least one control algorithm of the electric device ED1 can be executed by the at least two hardware processors if needed or desired. The at least one control algorithm of the electric device ED1 can be stored in the at least two hardware memories if needed or desired. The first electronic controller circuitry EC1 can include at least two circuit boards which are separately provided if needed or desired. The first electronic controller circuitry EC1 can include at least two system buses which are separately provided if needed or desired.

As seen in FIG. 6, the first communicator circuitry WC1 is electrically mounted on the circuit board EC13. The first communicator circuitry WC1 is electrically mounted on the circuit board EC13. The first communicator circuitry WC1 is electrically connected to the processor EC11 and the memory EC12 with the circuit board EC13 and the system bus EC14. However, the first communicator circuitry WC1 can be electrically mounted on another circuit board in a case where the first electronic controller circuitry EC1 includes at least two circuit boards. The first communicator circuitry WC1 can be electrically mounted on another circuit board in a case where the first electronic controller circuitry EC1 includes at least two circuit boards. The first communicator circuitry WC1 can be electrically mounted on an electric component other than a circuit board.

At least one of the processor EC11, the memory EC12, and the first communicator circuitry WC1 can be integrally provided with another of the processor EC11, the memory EC12, and the first communicator circuitry WC1 as a single chip if needed or desired. At least one of the processor EC11, the memory EC12, and the first communicator circuitry WC1 can be a separate chip from another of the processor EC11, the memory EC12, and the first communicator circuitry WC1 if needed or desired.

The electric device ED1 includes a user interface ED18. The user interface ED18 is configured to receive a user input U1. The user interface ED18 is electrically connected to the first electronic controller circuitry EC1. The first electronic controller circuitry EC1 is configured to recognize the user input U1 received by the user interface ED18. For example, the user interface ED18 includes an electric switch configured to be activated in response to the user input U1. The user interface ED18 can be omitted from the electric device ED1 if needed or desired.

As seen in FIG. 6, the second electric device ED2 of the human-powered vehicle 10 comprises second electronic controller circuitry EC2. The second electronic controller circuitry EC2 is configured to control the second communicator circuitry WC2 to communicate with another communicator circuitry such as the first communicator circuitry WC1. The second electronic controller circuitry EC2 is configured to control the second wireless communicator circuitry WC21 to wirelessly communicate with another wireless communicator circuitry such as the first wireless communicator circuitry WC11. The second communicator circuitry WC2 is configured to be paired with another communicator such as the first communicator circuitry WC1 through a pairing process. The wireless second communicator circuitry WC21 is configured to be paired with another wireless communicator such as the first wireless communicator circuitry WC11 through a pairing process.

The second electronic controller circuitry EC2 includes a processor EC21. The second electronic controller circuitry EC2 includes a memory EC22. The processor EC21 is coupled to the memory EC22. The memory EC22 is coupled to the processor EC21. The second electric device ED2 includes a circuit board EC23 and a system bus EC24. The processor EC21 and the memory EC22 are electrically mounted on the circuit board EC23. The processor EC21 is electrically connected to the memory EC22 via the circuit board EC23 and the system bus EC24. The memory EC22 is electrically connected to the processor EC21 via the circuit board EC23 and the system bus EC24. For example, the second electronic controller circuitry EC2 includes a semiconductor. The processor EC21 includes a semiconductor. The memory EC22 includes a semiconductor. However, the second electronic controller circuitry EC2 can be free of a semiconductor if needed or desired. The processor EC21 can be free of a semiconductor if needed or desired. The memory EC22 can be free of a semiconductor if needed or desired.

For example, the processor EC21 includes at least one of a central processing unit (CPU), a micro processing unit (MPU), and a memory controller. The memory EC22 is electrically connected to the processor EC21. For example, the memory EC22 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC22 includes storage areas each having an address. The processor EC21 is configured to control the memory EC22 to store data in the storage areas of the memory EC22 and reads data from the storage areas of the memory EC22. The processor EC21 can also be referred to as a hardware processor EC21 or a processor circuit or circuitry EC21. The memory EC22 can also be referred to as a hardware memory EC22 or a memory circuit or circuitry EC22. The memory EC22 can also be referred to as a computer-readable storage medium EC22.

The second electronic controller circuitry EC2 is configured to execute at least one control algorithm of the second electric device ED2. For example, the second electronic controller circuitry EC2 is programed to execute at least one control algorithm of the second electric device ED2. The memory EC22 stores at least one program including at least one program instruction. The at least one program is read into the processor EC21, and thereby the at least one control algorithm of the second electric device ED2 is executed based on the at least one program.

The structure of the second electronic controller circuitry EC2 is not limited to the above structure. The structure of the second electronic controller circuitry EC2 is not limited to the above structure. The structure of the second electronic controller circuitry EC2 is not limited to the processor EC21 and the memory EC22. The second electronic controller circuitry EC2 can be realized by hardware alone or a combination of hardware and software. In the present embodiment, the processor EC21 and the memory EC22 are integrated as a single chip such as an application specific integrated circuit (ASIC) or a field programmable gate array (FPGA). However, the processor EC21 and the memory EC22 can be separate chips if needed or desired. The second electronic controller circuitry EC2 can include the processor EC21, the memory EC22, the circuit board EC23, and the system bus EC24 if needed or desired. The second electronic controller circuitry EC2 can be at least two electronic controllers which are separately provided.

The second electronic controller circuitry EC2 can include at least two electronic controllers which are separately provided. The at least one control algorithm of the second electric device ED2 can be executed by the at least two electronic controllers if needed or desired. The second electronic controller circuitry EC2 can include at least two hardware processors which are separately provided. The second electronic controller circuitry EC2 can include at least two hardware memories which are separately provided. The at least one control algorithm of the second electric device ED2 can be executed by the at least two hardware processors if needed or desired. The at least one control algorithm of the second electric device ED2 can be stored in the at least two hardware memories if needed or desired. The second electronic controller circuitry EC2 can include at least two circuit boards which are separately provided if needed or desired. The second electronic controller circuitry EC2 can include at least two system buses which are separately provided if needed or desired.

As seen in FIG. 6, the second communicator circuitry WC2 is electrically mounted on the circuit board EC23. The second communicator circuitry WC2 is electrically mounted on the circuit board EC23. The second communicator circuitry WC2 is electrically connected to the processor EC21 and the memory EC22 with the circuit board EC23 and the system bus EC24. However, the second communicator circuitry WC2 can be electrically mounted on another circuit board in a case where the second electronic controller circuitry EC2 includes at least two circuit boards. The second communicator circuitry WC2 can be electrically mounted on another circuit board in a case where the second electronic controller circuitry EC2 includes at least two circuit boards. The second communicator circuitry WC2 can be electrically mounted on an electric component other than a circuit board.

At least one of the processor EC21, the memory EC22, and the second communicator circuitry WC2 can be integrally provided with another of the processor EC21, the memory EC22, and the second communicator circuitry WC2 as a single chip if needed or desired. At least one of the processor EC21, the memory EC22, and the second communicator circuitry WC2 can be a separate chip from another of the processor EC21, the memory EC22, and the second communicator circuitry WC2 if needed or desired.

The second electric device ED2 includes the electric power source ED25 and the power source holder ED26. The electric power source ED25 is electrically connected to the second electronic controller circuitry EC2 and the second communicator circuitry WC2 to supply electricity to the second electronic controller circuitry EC2 and the second communicator circuitry WC2.

The second electric device ED2 includes the additional user interface ED28. The additional user interface ED28 is configured to receive the additional user input U2. The additional user interface ED28 is electrically connected to the second electronic controller circuitry EC2. The second electronic controller circuitry EC2 is configured to recognize the additional user input U2 received by the additional user interface ED28. For example, the additional user interface ED28 includes an electric switch configured to be activated in response to the additional user input U2.

The second electronic controller circuitry EC2 is configured to control the second communicator circuitry WC2 to transmit the signal SG in response to the additional user input U2 received by the additional user interface ED28. The second electronic controller circuitry EC2 is configured to control the second wireless communicator circuitry WC21 to wirelessly transmit the signal SG in response to the additional user input U2 received by the additional user interface ED28.

The electric device ED1 includes an actuator driver ED17. The actuator driver ED17 is electrically connected to the electric actuator ED13 and the first electronic controller circuitry EC1. The actuator driver ED17 is configured to control the electric actuator ED13 based on a command generated by the first electronic controller circuitry EC1. The first electronic controller circuitry EC1 is configured to generate the command based on the signal SG in the second state S12. The electric actuator ED13 is configured to generate the actuation force in response to the command generated by the actuator driver ED17.

As seen in FIG. 6, the additional electric device ED3 includes additional communicator circuitry WC3. The first communicator circuitry WC1 is configured to communicate with another communicator circuitry such as the additional communicator circuitry WC3. The additional communicator circuitry WC3 is configured to communicate with another communicator circuitry such as the first communicator circuitry WC1.

In the present embodiment, the first electronic controller circuitry EC1 is configured to be electrically connected to the additional electric device ED3 via an electric cable CB1. The first communicator circuitry WC1 includes wired communicator circuitry WC12. The additional communicator circuitry WC3 includes additional wired communicator circuitry WC32. The wired communicator circuitry WC12 is configured to communicate with another wired communicator circuitry such as the additional wired communicator circuitry WC32 via the electric cable CB1. The additional wired communicator circuitry WC32 is configured to communicate with another wired communicator circuitry such as the wired communicator circuitry WC12 via the electric cable CB1.

The electric device ED1 includes a connector port ED19 to which the electric cable CB1 or the additional electric cable CB2 is to be electrically connected. The connector port ED19 is configured to be detachably and reattachably connected to the electric cable CB1 or the additional electric cable CB2. The wired communicator circuitry WC12 is electrically connected to the connector port ED19. The additional electric cable CB2 is electrically connected to the power source holder ED16. Electricity is supplied from the additional electric device ED3 via the electric cable CB1 in a state where the electric cable CB1 is electrically connected to the connector port ED19. Electricity is supplied from the electric power source ED15 via the power source holder ED16 and the additional electric cable CB2 in a state where the additional electric cable CB2 is electrically connected to the connector port ED19. In a case where the additional electric cable CB2 is detached from the connector port ED19, for example, the electric power source ED15 can be detached from the power source holder ED16, and a dummy battery can be attached to the power source holder ED16.

Figure 7:
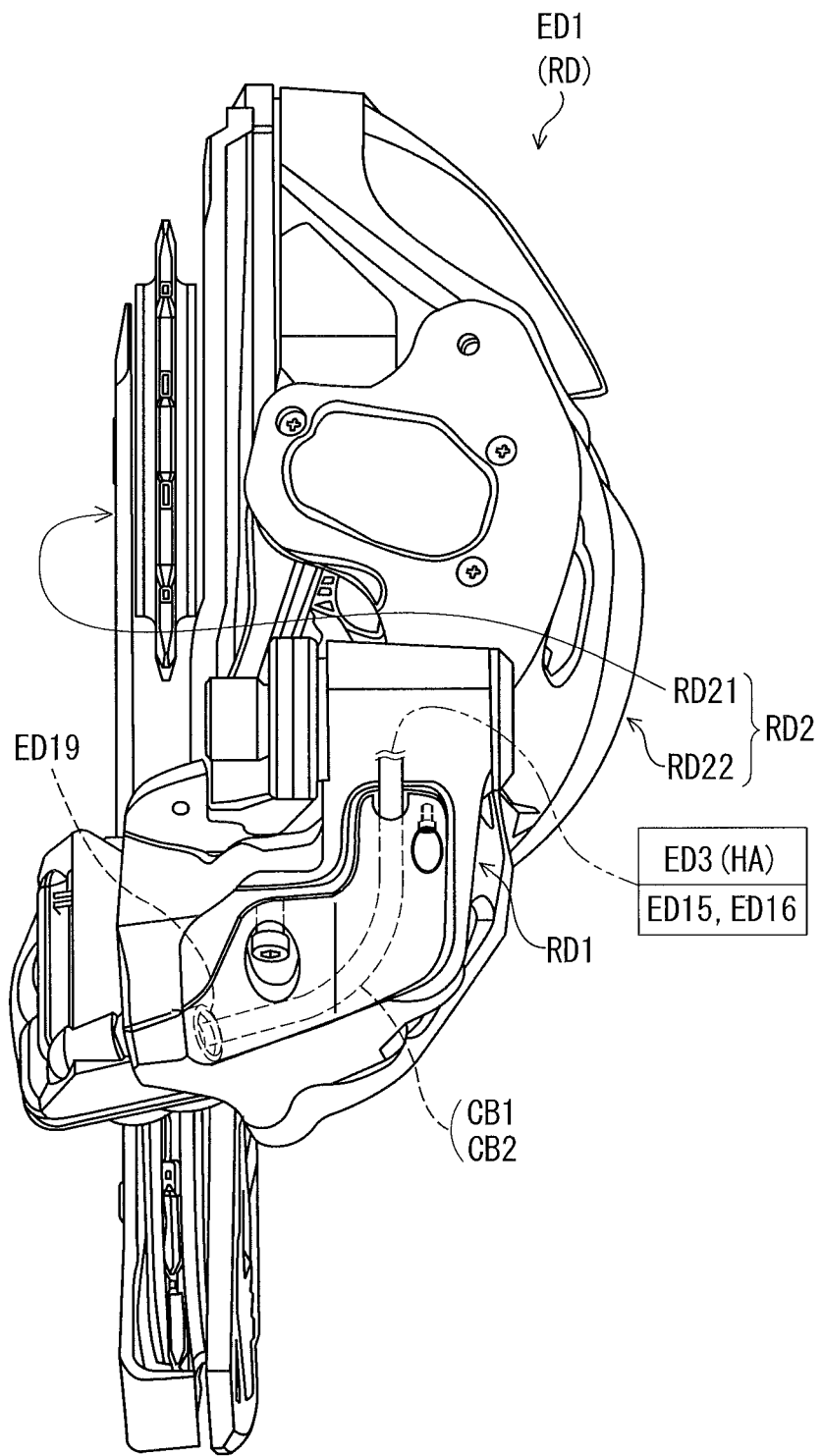
FIG. 7 is a top view of the electric device illustrated in FIG. 3.

As seen in FIG. 7, the connector port ED19 is provided to the base member RD1. However, the connector port ED19 can be provided to another part other than the base member RD1 if needed or desired.

As seen in FIG. 6, the additional electric device ED3 includes an additional connector port ED39 to which the electric cable CB1 is to be electrically connected. The additional connector port ED39 is configured to be detachably and reattachably connected to the electric cable CB1. The additional wired communicator circuitry WC32 is electrically connected to the additional connector port ED39. However, the electric cable CB1 can be directly connected to the additional wired communicator circuitry WC32 without the additional connector port ED39 if needed or desired.

In the present embodiment, the additional electric device ED3 is separately provided from the electric device ED1. However, the additional electric device ED3 can be at least partially provided integrally with the electric device ED1 as a single device if needed or desired.

As seen in FIG. 6, the additional electric device ED3 of the human-powered vehicle 10 comprises additional electronic controller circuitry EC3. The additional electronic controller circuitry EC3 is configured to control the additional communicator circuitry WC3 to communicate with another communicator circuitry such as the first communicator circuitry WC1. The additional electronic controller circuitry EC3 is configured to control the additional wired communicator circuitry WC32 to communicate with another wired communicator circuitry such as the wired communicator circuitry WC12 via the electric cable CB1.

In the present embodiment, the additional electric device ED3 includes the additional electronic controller circuitry EC3. However, the electrical parts of the additional electric device ED3 can be included in the electric device ED1 if needed or desired. For example, the electric device ED1 can include the additional electronic controller circuitry EC3 if needed or desired. In such modifications, the additional electronic controller circuitry EC3 can be at least partially provided integrally with the first electronic controller circuitry EC1 as a single unit.

The additional electronic controller circuitry EC3 includes a processor EC31. The additional electronic controller circuitry EC3 includes a memory EC32. The processor EC31 is coupled to the memory EC32. The memory EC32 is coupled to the processor EC31. The additional electric device ED3 includes a circuit board EC33 and a system bus EC34. The processor EC31 and the memory EC32 are electrically mounted on the circuit board EC33. The processor EC31 is electrically connected to the memory EC32 via the circuit board EC33 and the system bus EC34. The memory EC32 is electrically connected to the processor EC31 via the circuit board EC33 and the system bus EC34. For example, the additional electronic controller circuitry EC3 includes a semiconductor. The processor EC31 includes a semiconductor. The memory EC32 includes a semiconductor. However, the additional electronic controller circuitry EC3 can be free of a semiconductor if needed or desired. The processor EC31 can be free of a semiconductor if needed or desired. The memory EC32 can be free of a semiconductor if needed or desired.

For example, the processor EC31 includes at least one of a central processing unit (CPU), a micro processing unit (MPU), and a memory controller. The memory EC32 is electrically connected to the processor EC31. For example, the memory EC32 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC32 includes storage areas each having an address. The processor EC31 is configured to control the memory EC32 to store data in the storage areas of the memory EC32 and reads data from the storage areas of the memory EC32. The processor EC31 can also be referred to as a hardware processor EC31 or a processor circuit or circuitry EC31. The memory EC32 can also be referred to as a hardware memory EC32 or a memory circuit or circuitry EC32. The memory EC32 can also be referred to as a computer-readable storage medium EC32.

The additional electronic controller circuitry EC3 is configured to execute at least one control algorithm of the additional electric device ED3. For example, the additional electronic controller circuitry EC3 is programed to execute at least one control algorithm of the additional electric device ED3. The memory EC32 stores at least one program including at least one program instruction. The at least one program is read into the processor EC31, and thereby the at least one control algorithm of the additional electric device ED3 is executed based on the at least one program.

The structure of the additional electronic controller circuitry EC3 is not limited to the above structure. The structure of the additional electronic controller circuitry EC3 is not limited to the above structure. The structure of the additional electronic controller circuitry EC3 is not limited to the processor EC31 and the memory EC32. The additional electronic controller circuitry EC3 can be realized by hardware alone or a combination of hardware and software. In the present embodiment, the processor EC31 and the memory EC32 are integrated as a single chip such as an application specific integrated circuit (ASIC) or a field programmable gate array (FPGA). However, the processor EC31 and the memory EC32 can be separate chips if needed or desired. The additional electronic controller circuitry EC3 can include the processor EC31, the memory EC32, the circuit board EC33, and the system bus EC34 if needed or desired. The additional electronic controller circuitry EC3 can be at least two electronic controllers which are separately provided.

The additional electronic controller circuitry EC3 can include at least two electronic controllers which are separately provided. The at least one control algorithm of the additional electric device ED3 can be executed by the at least two electronic controllers if needed or desired. The additional electronic controller circuitry EC3 can include at least two hardware processors which are separately provided. The additional electronic controller circuitry EC3 can include at least two hardware memories which are separately provided. The at least one control algorithm of the additional electric device ED3 can be executed by the at least two hardware processors if needed or desired. The at least one control algorithm of the additional electric device ED3 can be stored in the at least two hardware memories if needed or desired. The additional electronic controller circuitry EC3 can include at least two circuit boards which are separately provided if needed or desired. The additional electronic controller circuitry EC3 can include at least two system buses which are separately provided if needed or desired.

As seen in FIG. 6, the additional communicator circuitry WC3 is electrically mounted on the circuit board EC33. The additional communicator circuitry WC3 is electrically mounted on the circuit board EC33. The additional communicator circuitry WC3 is electrically connected to the processor EC31 and the memory EC32 with the circuit board EC33 and the system bus EC34. However, the additional communicator circuitry WC3 can be electrically mounted on another circuit board in a case where the additional electronic controller circuitry EC3 includes at least two circuit boards. The additional communicator circuitry WC3 can be electrically mounted on another circuit board in a case where the additional electronic controller circuitry EC3 includes at least two circuit boards. The additional communicator circuitry WC3 can be electrically mounted on an electric component other than a circuit board.

At least one of the processor EC31, the memory EC32, and the additional communicator circuitry WC3 can be integrally provided with another of the processor EC31, the memory EC32, and the additional communicator circuitry WC3 as a single chip if needed or desired. At least one of the processor EC31, the memory EC32, and the additional communicator circuitry WC3 can be a separate chip from another of the processor EC31, the memory EC32, and the additional communicator circuitry WC3 if needed or desired.

As seen in FIG. 6, the wired communicator circuitry WC12 is configured to communicate with another wired communicator circuitry such as the additional wired communicator circuitry WC32 via the electric cable CB1 using power line communication technology. The additional wired communicator circuitry WC32 is configured to communicate with another wired communicator circuitry such as the wired communicator circuitry WC12 via the electric cable CB1 using power line communication technology. Power line communication (PLC) carries data on a conductor that is also used simultaneously for electric power transmission or electric power distribution to devices such as the electric device ED1 and the additional electric device ED3.

For example, the electric cable CB1 includes a ground line and a voltage line that are detachably connected to a serial bus that is formed by communication interfaces. In the present embodiment, the wired communicator circuitry WC12 is configured to communicate with another wired communicator circuitry such as the additional wired communicator circuitry WC32 through the voltage line using the PLC technology. The wired communicator circuitry WC12 is configured to superimpose signals on a power source voltage applied from the additional electric device ED3 to the electric cable CB1. The wired communicator circuitry WC12 is configured to receive a signal from the first electronic controller circuitry EC1 and is configured to superimpose the signal on the power source voltage. The wired communicator circuitry WC12 is configured to separate, from the power source voltage, signals superimposed on the power source voltage of the electric cable CB1. The wired communicator circuitry WC12 is configured to transmit to the first electronic controller circuitry EC1 signals separated from the power source voltage. The wired communicator circuitry WC12 can be omitted from the electric device ED1 in a case where the electric device ED1 includes an electric power source.

In the present embodiment, the additional wired communicator circuitry WC32 is configured to communicate with another wired communicator circuitry such as the wired communicator circuitry WC12 through the voltage line using the PLC technology. The additional wired communicator circuitry WC32 is configured to superimpose signals on the power source voltage applied from the additional electric device ED3 to the electric cable CB1. The additional wired communicator circuitry WC32 is configured to receive a signal from the additional electronic controller circuitry EC3 and is configured to superimpose the signal on the power source voltage. The additional wired communicator circuitry WC32 is configured to separate, from the power source voltage, signals superimposed on the power source voltage of the electric cable CB1. The additional wired communicator circuitry WC32 is configured to transmit to the additional electronic controller circuitry EC3 signals separated from the power source voltage. The additional wired communicator circuitry WC32 and the additional connector port ED39 can be omitted from the additional electric device ED3 in a case where the electric device ED1 includes an electric power source and the additional electric device ED3 does not supply electricity to another electric device such as the electric device ED1.

Figure 8:
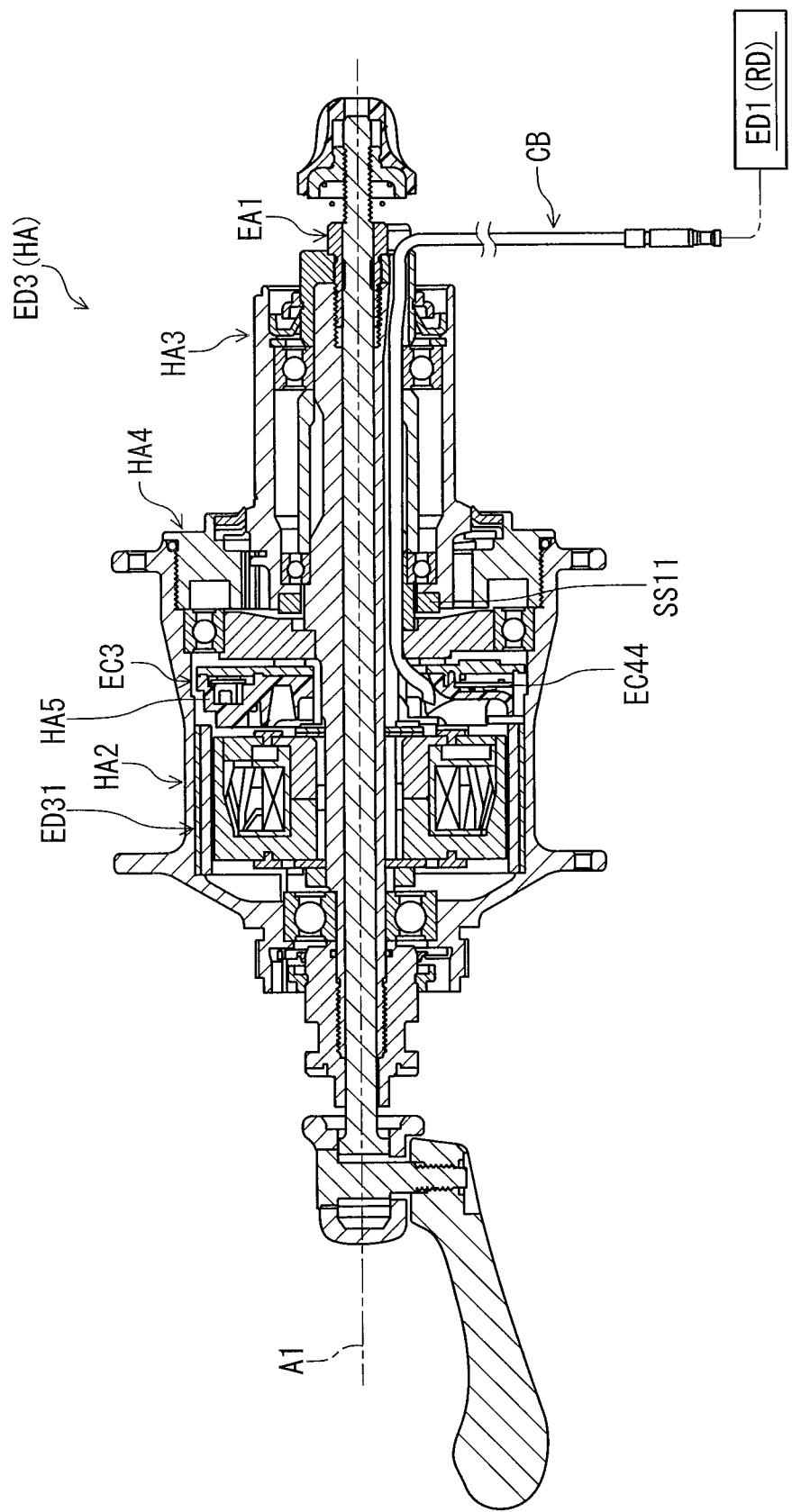
FIG. 8 is a cross-sectional view of the additional electric device illustrated in FIG. 5.

As seen in FIG. 8, the additional electric device ED3 includes an electric power generator ED31. The electric power generator ED31 is configured to generate electricity in response to relative rotation between the hub shell HA2 and the hub axle HA1. The electric power generator ED31 includes a coil, a yoke, and a magnet. The coil is wound around the yoke. The coil and the yoke are provided to one of the hub axle HA1 and the hub shell HA2. The magnet is provided to the other of the hub axle HA1 and the hub shell HA2.

As seen in FIG. 6, the additional electric device ED3 includes an electric power storage ED32. The electric power storage ED32 is electrically connected to the electric power generator ED31 to store electricity generated by the electric power generator ED31. The electric power storage ED32 is electrically connected to the electric cable CB1. The electric power storage ED32 is configured to supply electricity to another electric device such as the electric device ED1 via the electric cable CB1. For example, the electric device ED1 is powered by the electric power storage ED32.

Figure 9:
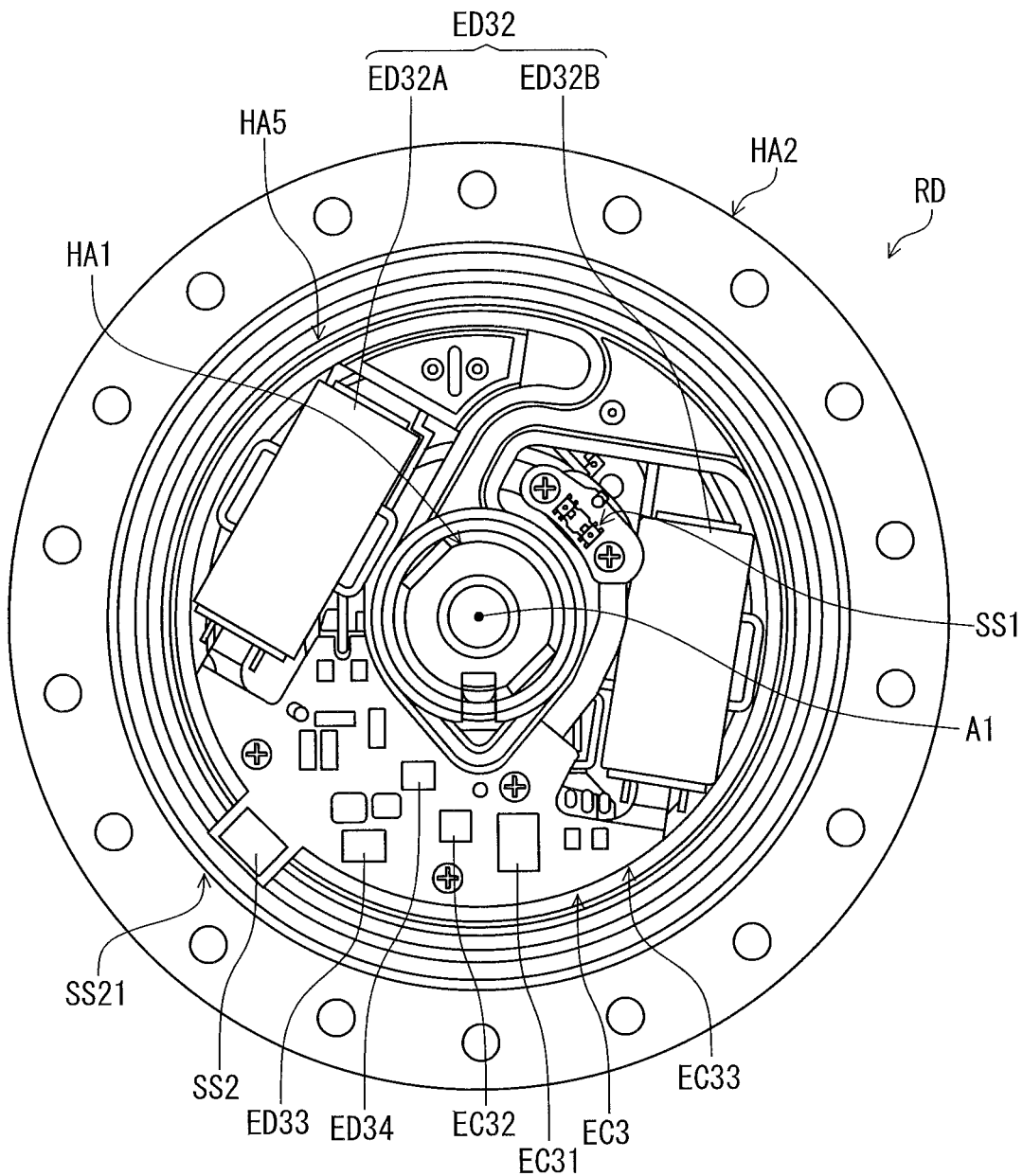
FIG. 9 is another cross-sectional view of the additional electric device illustrated in FIG. 5.

As seen in FIG. 9, the electric power storage ED32 includes a first electric power storage ED32A and a second electric power storage ED32B. Examples of the electric power storage ED32 include at least one of a capacitor and a battery. Examples of the first electric power storage ED32A include at least one of a capacitor and a battery. Examples of the second electric power storage ED32B include at least one of a capacitor and a battery. However, the electric power storage ED32 can include another electric power storage if needed or desired. One of the first electric power storage ED32A and the second electric power storage ED32B can be omitted from the electric power storage ED32 if needed or desired.

A display device such as the electric device SP can be configured to display the remaining level of the electric power storage ED32. The display device such as the electric device SP can be configured to display a message indicating that the electric power storage ED32 needs more electric power generation in a case where the remaining level is lower than a level threshold.

The additional electronic controller circuitry EC3 is mounted to the hub axle HA1. The additional electronic controller circuitry EC3 and the electric power storage ED32 are provided in the hub shell HA2. The circuit board EC33 is secured to the hub axle HA1. The electric device HA includes a housing HA5. The housing HA5 is secured to the hub axle HA1. The circuit board EC33 and the electric power storage ED32 are secured to the housing HA5. The first electric power storage ED32A and the second electric power storage ED32B are secured to the housing HA5.

As seen in FIG. 6, the additional electric device ED3 includes a charging circuit ED33 and a discharging circuit ED34. The charging circuit ED33 is electrically connected to the electric power generator ED31 and the electric power storage ED32. The electric power generator ED31 is electrically connected to the electric power storage ED32 via the charging circuit ED33.

The discharging circuit ED34 is electrically connected to the additional electronic controller circuitry EC3, the additional communicator circuitry WC3, and the electric power storage ED32. The additional electronic controller circuitry EC3 is electrically connected to the electric power storage ED32 and the additional communicator circuitry WC3 via the discharging circuit ED34.

The charging circuit ED33 is electrically connected to the discharging circuit ED34 to control the discharging circuit ED34. The charging circuit ED33 is configured to control charging of the electric power storage ED32 using electricity generated by the electric power generator ED31. The charging circuit ED33 is configured to control the discharging circuit ED34 to supply electricity stored in the electric power storage ED32 to the additional electronic controller circuitry EC3 and the additional communicator circuitry WC3. The charging circuit ED33 is configured to control the discharging circuit ED34 to stop supplying electricity stored in the electric power storage ED32 to the additional electronic controller circuitry EC3 and the additional communicator circuitry WC3. For example, the discharging circuit ED34 includes a field effect transistor (FET). The charging circuit ED33 includes a circuit configured to control the FET of the discharging circuit ED34. However, the structures of the charging circuit ED33 and the discharging circuit ED34 are not limited to the above structure.

The additional wired communicator circuitry WC32 is configured to receive voltage supplied from the electric power storage ED32 via the discharging circuit ED34. The additional wired communicator circuitry WC32 is configured to supply voltage to the wired communicator circuitry WC12 via the electric cable CB1.

The charging circuit ED33 includes a voltage sensor configured to sense the output voltage of at least one of at least one of the electric power generator ED31 and the electric power storage ED32. The additional electronic controller circuitry EC3 is electrically connected to the charging circuit ED33 to receive the sensed output voltage from the charging circuit ED33. The voltage sensor can be a separate circuit from the charging circuit ED33 if needed or desired.

As seen in FIG. 6, in the present embodiment, the first electronic controller circuitry EC1 is configured to receive electricity from the electric power generator ED31 configured to generate electricity. The first electronic controller circuitry EC1 is configured to receive electricity from the electric power storage ED32 configured to store electricity.

In the present embodiment, the first electronic controller circuitry EC1 is configured to receive electricity from the electric power storage ED32 via the additional wired communicator circuitry WC32, the electric cable CB1, and the wired communicator circuitry WC12. However, the first electronic controller circuitry EC1 can be configured to receive electricity from another electric power source configured to store electricity if needed or desired. The first electronic controller circuitry EC1 can be configured to receive electricity from another electric power source without an electric power generator if needed or desired.

As seen in FIG. 6, the electric system 24 further comprises a first sensor SS1 and a second sensor SS2. The first sensor SS1 is configured to sense a first sensor object SS11. The second sensor SS2 is configured to sense a second sensor object SS21 different from the first sensor object S S11. The first sensor SS1 is configured to output a first output OP1. The second sensor SS2 is configured to output a second output OP2. The first output OP1 relates to a traveling state of the human-powered vehicle 10. The second output OP2 relates to the traveling state of the human-powered vehicle 10. The first sensor SS1 is configured to generate a first output signal as the first output OP1. The second sensor SS2 is configured to generate a second output signal as the second output OP2.

For example, the traveling state of the human-powered vehicle 10 includes at least one of: vibration of the human-powered vehicle 10; pedaling torque of the crank 12 of the human-powered vehicle 10; cadence of the human-powered vehicle 10; and a speed of the human-powered vehicle 10. The first sensor SS1 is configured to sense one of: the vibration of the human-powered vehicle 10; the pedaling torque of the crank 12 of the human-powered vehicle 10; the cadence of the human-powered vehicle 10; and the speed of the human-powered vehicle 10. The second sensor SS2 is configured to sense another of: the vibration of the human-powered vehicle 10; the pedaling torque of the crank 12 of the human-powered vehicle 10; the cadence of the human-powered vehicle 10; and the speed of the human-powered vehicle 10.

At least one of the first sensor SS1 and the second sensor SS2 can include an accelerometer configured to sense acceleration applied to the human-powered vehicle 10 or vibration of the human-powered vehicle 10. At least one of the first sensor S S1 and the second sensor SS2 can include a power meter configured to sense the pedaling torque applied to the crank 12. Examples of the power meter include a strain gauge unit. At least one of the first sensor SS1 and the second sensor SS2 can include a cadence sensor configured to sense the cadence of the human-powered vehicle 10. Examples of the cadence of the human-powered vehicle 2 include a rotational speed of the crank 12, a rotational speed of the sprocket assembly 18, and a rotational speed of the sprocket support body HA3 of the electric device HA. Examples of the first sensor object SS11 include the crank 12, the sprocket assembly 18, the sprocket support body HA3, a sensor object provided to the crank 12, a sensor object provided to the sprocket assembly 18, and a sensor object provided to the sprocket support body HA3. At least one of the first sensor SS1 and the second sensor SS2 can include a speed sensor configured to sense the speed of the human-powered vehicle 10. Examples of the speed of the human-powered vehicle 2 include a rotational speed of the wheel 12A or 12B, a rotational speed of the hub shell HA2 of the electric device HA, and aerodynamic information of the human-powered vehicle 10. Examples of the second sensor object SS21 include the wheel 12A or 12B, the hub shell HA2, a sensor object provided to the wheel 12A or 12B, a sensor object provided to the hub shell HA2, and a sensor configured to sense aerodynamic resistance.

In the present embodiment, the first sensor SS1 is configured to sense the cadence of the human-powered vehicle 10. The first sensor SS1 is configured to sense the rotational speed of the sprocket support body HA3. The first sensor object SS11 is provided to the sprocket support body HA3. Examples of the first sensor SS1 includes a mechanical sensor, a magnetic sensor, and an optical sensor. Examples of the mechanical sensor includes a potentiometer. Examples of the magnetic sensor include a hall sensor and a resolver. Examples of the optical sensor includes an encoder.

The first sensor SS1 can be configured to sense one of: the rotational speed of the crank 12; and the rotational speed of the sprocket assembly 18 if needed or desired. The first sensor SS1 can be configured to sense one of: the vibration of the human-powered vehicle 10; the pedaling torque of the crank 12 of the human-powered vehicle 10; and the speed of the human-powered vehicle 10 if needed or desired.

In the present embodiment, the second sensor SS2 is configured to sense the speed of the human-powered vehicle 10. The second sensor SS2 is configured to sense the rotational speed of the hub shell HA2. The second sensor object SS21 is provided to the hub shell HA2. Examples of the second sensor SS2 includes a mechanical sensor, a magnetic sensor, and an optical sensor. Examples of the mechanical sensor includes a potentiometer. Examples of the magnetic sensor include a hall sensor and a resolver. Examples of the optical sensor includes an encoder. The second sensor SS2 can include another sensor such as an accelerator, a power meter, and a cadence sensor if needed or desired. The second sensor SS2 can be configured to sense the rotational speed of the hub shell HA2 based on the cycle of the electric power generation of the electric power generator ED31. The additional electronic controller circuitry EC3 is configured to sense the rotational speed of the hub shell HA2 based on the cycle of the electric power generation of the electric power generator ED31. Namely, additional electronic controller circuitry EC3 and the electric power generator ED31 can constitute the second sensor SS2.

The second sensor SS2 can be configured to sense the rotational speed of the wheel 12A or 12B if needed or desired. The second sensor SS2 can be configured to sense one of: the vibration of the human-powered vehicle 10; the pedaling torque of the crank 12 of the human-powered vehicle 10; and the cadence of the human-powered vehicle 10 if needed or desired.

Figure 10:
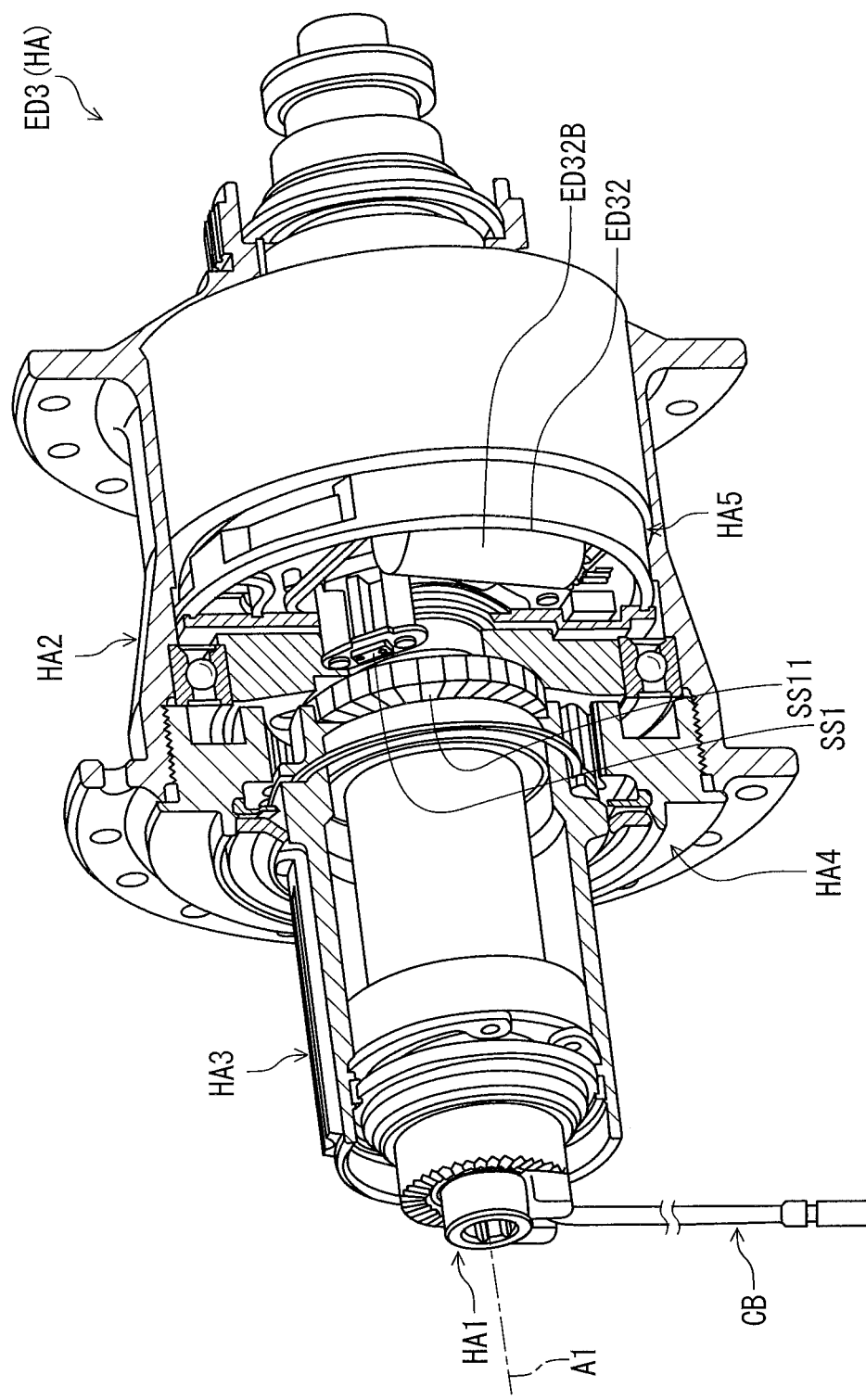
FIG. 10 is a perspective view of the additional electric device illustrated in FIG. 5.

As seen in FIG. 10, the first sensor SS1 is provided in the hub shell HA2. The first sensor object SS11 is provided in the hub shell HA2. The first sensor object SS11 is attached to the sprocket support body HA3. The first sensor SS1 is arranged to face the first sensor object SS11. The first sensor SS1 can be provided to the sprocket support body HA3 if needed or desired. The first sensor object SS11 can be provided to the hub axle HA1 if needed or desired. The first sensor SS1 and the first sensor object SS11 can be provided to be rotatable relatively in response to relative rotation between the hub axle HA1 and the sprocket support body HA3.

As seen in FIG. 9, the second sensor SS2 is provided in the hub shell HA2. The second sensor object SS21 is provided in the hub shell HA2. The second sensor object SS21 is attached to the hub shell HA2. The second sensor SS2 is arranged to face the second sensor object SS21. The second sensor SS2 can be provided to the hub shell HA2 if needed or desired. The second sensor object SS21 can be provided to the hub axle HA1 if needed or desired. The second sensor SS2 and the second sensor object SS21 can be provided to be rotatable relatively in response to relative rotation between the hub axle HA1 and the hub shell HA2.

As seen in FIG. 6, the first electronic controller circuitry EC1 of the electric device ED1 is configured to be electrically connected to the first sensor SS1 to receive the first output OP1 from the first sensor SS1. The first electronic controller circuitry EC1 is configured to be electrically connected to the second sensor SS2 to receive the second output OP2 from the second sensor SS2.

In the present embodiment, the additional electric device ED3 is configured to be electrically connected to the first electronic controller circuitry EC1 of the electric device ED1. The first electronic controller circuitry EC1 is configured to be electrically connected to the additional electronic controller circuitry EC3. The first electronic controller circuitry EC1 is configured to be electrically connected to the additional electronic controller circuitry EC3 via the wired communicator circuitry WC12, the connector port ED19, the electric cable CB1, and the additional wired communicator circuitry WC32.

The additional electronic controller circuitry EC3 is electrically connected to the first sensor SS1 to receive the first output OP1 from the first sensor SS1. The additional electronic controller circuitry EC3 is electrically connected to the second sensor SS2 to receive the second output OP2 from the second sensor SS2.

The additional electronic controller circuitry EC3 is configured to generate a first command CM1 in response to the first output OP1 of the first sensor SS1. The additional electronic controller circuitry EC3 is configured to transmit the first command CM1 to the first electronic controller circuitry EC1 via the additional wired communicator circuitry WC32, the electric cable CB1, the connector port ED19, and the wired communicator circuitry WC12. The first command CM1 is indicative of the first output OP1. The first command CM1 can also be referred to as a command CM1.

The additional electronic controller circuitry EC3 is configured to generate a second command CM2 in response to the second output OP2 of the second sensor SS2. The additional electronic controller circuitry EC3 is configured to transmit the second command CM2 to the first electronic controller circuitry EC1 via the additional wired communicator circuitry WC32, the electric cable CB1, the connector port ED19, and the wired communicator circuitry WC12. The second command CM2 is indicative of the second output OP2. The second command CM2 can also be referred to as a command CM2.

In the present embodiment, the first electronic controller circuitry EC1 is configured to receive the first command CM1 or the second command CM2 from the additional electronic controller circuitry EC3 via the additional wired communicator circuitry WC32, the electric cable CB1, the connector port ED19, and the wired communicator circuitry WC12. However, the first electronic controller circuitry EC1 can be configured to receive the first command CM1 or the second command CM2 from the additional electronic controller circuitry EC3 without at least one of the additional wired communicator circuitry WC32, the electric cable CB1, the connector port ED19, and the wired communicator circuitry WC12 if needed or desired.

Figure 11:
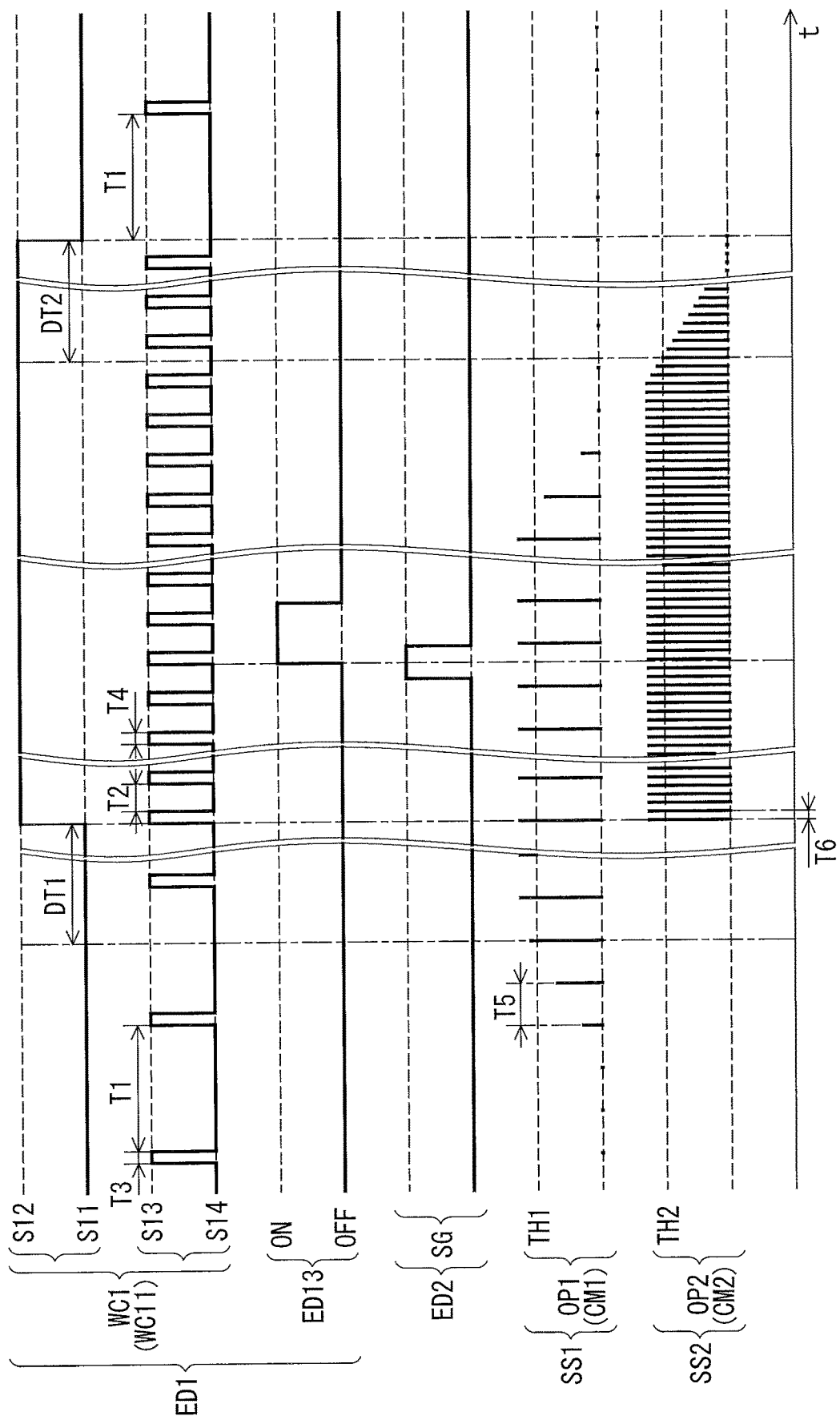
FIG. 11 is a time chart showing control of the control system illustrated in FIG. 1.

As seen in FIG. 11, the first sensor SS1 is configured to periodically output the first output OP1 at a first sensing interval T5. The second sensor SS2 is configured to periodically output the second output OP2 at a second sensing interval T6. The additional electronic controller circuitry EC3 is configured to receive the first output OP1 from the first sensor SS1 at the first sensing interval T5. The additional electronic controller circuitry EC3 is configured to receive the second output OP2 from the second sensor SS2 at the second sensing interval T6.

The additional electronic controller circuitry EC3 is configured to transmit the first command CM1 to the first electronic controller circuitry EC1 at the first sensing interval T5. The additional electronic controller circuitry EC3 is configured to transmit the second command CM2 to the first electronic controller circuitry EC1 at the second sensing interval T6.

The first electronic controller circuitry EC1 is configured to receive the first command CM1 from the additional electronic controller circuitry EC3 at the first sensing interval T5. The first electronic controller circuitry EC1 is configured to receive the second command CM2 from the additional electronic controller circuitry EC3 at the first sensing interval T5.

In the present embodiment, the first sensing interval T5 is different from the second sensing interval T6. The first sensing interval T5 is longer than the second sensing interval T6. However, the first sensing interval T5 can be equal to or shorter than the second sensing interval T6 if needed or desired.

The additional electronic controller circuitry EC3 is configured to turn the first sensor SS1 on or off. The additional electronic controller circuitry EC3 is configured to turn the second sensor SS2 on or off. The additional electronic controller circuitry EC3 is configured to turn the first sensor SS1 on in each of the first state and the second state. The additional electronic controller circuitry EC3 is configured to turn the second sensor SS2 off in the first state and configured to turn the second sensor SS2 on in the second state. Thus, the first sensor SS1 is configured to output the first output OP1 at the first sensing interval T5 in each of the first state and the second state. The second sensor SS2 is configured to output the second output OP2 at the second sensing interval T6 in the second state. The second sensor SS2 is configured to be free of outputting the second output OP2 in the first state. However, the second sensor SS2 can be configured to output the second output OP2 in the first state if needed or desired. The additional electronic controller circuitry EC3 can be configured to turn the second sensor SS2 on in each of the first state and the second state. In such modifications, the additional electronic controller circuitry EC3 is configured to ignore the second output OP2 in the first state while the additional electronic controller circuitry EC3 is configured to recognize the first output OP1.

Figure 12:
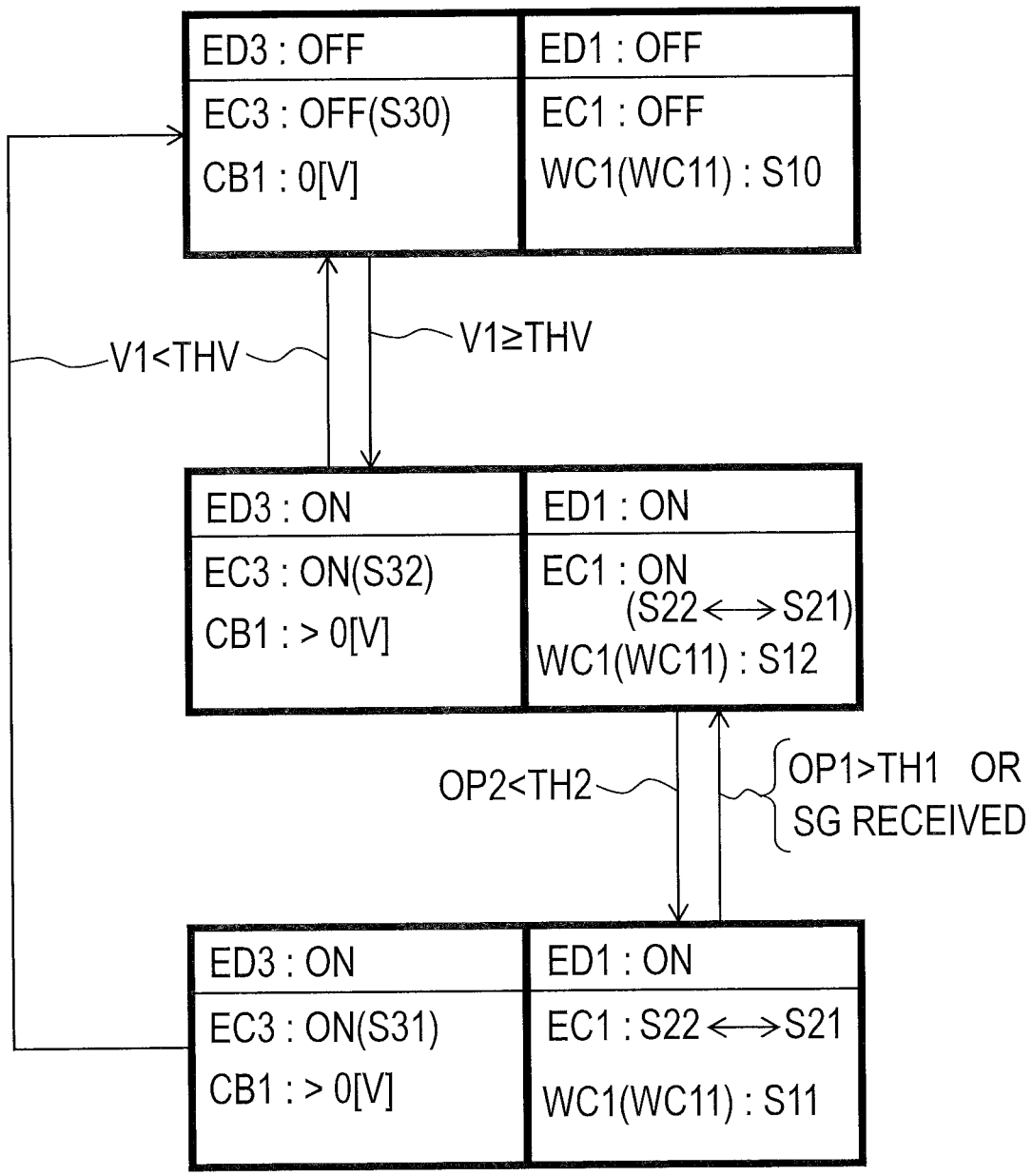
FIG. 12 is a schematic diagram showing control of the control system illustrated in FIG. 1.

As seen in FIG. 12, the first electronic controller circuitry EC1 is configured to change a state of the first communicator circuitry WC1 based on the first output OP1 of the first sensor SS1 or the second output OP2 of the second sensor SS2. The first electronic controller circuitry EC1 is configured to change a state of the first wireless communicator circuitry WC11 based on the first output OP1 of the first sensor SS1 or the second output OP2 of the second sensor SS2. The first electronic controller circuitry EC1 is configured to change the state of the first communicator circuitry WC1 based on the command CM1 or CM2 generated by the additional electric device ED3. The first electronic controller circuitry EC1 is configured to change the state of the first communicator circuitry WC1 based on the command CM1 or CM2 generated by the additional electronic controller circuitry EC3. The first electronic controller circuitry EC1 is configured to change the state of the first wireless communicator circuitry WC11 based on the command CM1 or CM2 generated by the additional electronic controller circuitry EC3.

The first communicator circuitry WC1 has a first state S11 and a second state S12. The first wireless communicator circuitry WC11 has the first state S11 and the second state S12. The first state S11 has first power consumption. The second state S12 has second power consumption. The first power consumption is lower than the second power consumption. For example, the first state S11 can also be referred to as a sleep state or mode. The second state S12 can also be referred to as a wake state or mode.

The first communicator circuitry WC1 has an OFF state S10. The first communicator circuitry WC1 is configured to be turned off in the OFF state S10. The power consumption of the OFF state S10 is lower than each of the first power consumption and the second power consumption. The first communicator circuitry WC1 is configured to be free of detecting the signal SG in the OFF state S10.

The additional electronic controller circuitry EC3 has an OFF state S30, a first state S31, and a second state S32. The additional electronic controller circuitry EC3 is configured to be turned off in the OFF state S30. The additional electronic controller circuitry EC3 is configured to be turned on in each of the first state S31 and the second state S32. The additional electronic controller circuitry EC3 is configured to be intermittently turned on in the first state S31. The additional electronic controller circuitry EC3 is configured to be continuously turned on in the second state S32. The power consumption of the OFF state S30 is lower than each of the power consumption of the first state S31 and the power consumption of the second state S32. The power consumption of the first state S31 is lower than the power consumption of the second state S32.

The additional electronic controller circuitry EC3 is configured to change the state of the additional electronic controller circuitry EC3 between the OFF state S30 and the second state S32 based on the sensed output voltage V1 sensed by the charging circuit ED33. The additional electronic controller circuitry EC3 is configured to change the state of the additional electronic controller circuitry EC3 from the OFF state S30 to the second state S32 in a case where the sensed output voltage V1 is equal to or higher than a voltage threshold THV. The additional electronic controller circuitry EC3 is configured to change the state of the additional electronic controller circuitry EC3 from the second state S32 to the OFF state S30 in a case where the sensed output voltage V1 is lower than the voltage threshold THV in the second state S32.

The additional electronic controller circuitry EC3 is configured to change the state of the additional electronic controller circuitry EC3 between the OFF state S30 and the first state S31 based on the sensed output voltage V1 sensed by the charging circuit ED33. The additional electronic controller circuitry EC3 is configured to change the state of the additional electronic controller circuitry EC3 from the first state S31 to the OFF state S30 in a case where the sensed output voltage V1 is lower than the voltage threshold THV in the first state S31.

The first communicator circuitry WC1 is configured to be in the OFF state S10 in a state where the additional electric device ED3 is electrically connected to the electric device ED1 via the electric cable CB1 and where the additional electronic controller circuitry EC3 is in the OFF state S30 since the additional electric device ED3 stops supplying electricity to the electric device ED1 in the OFF state S30.

The first communicator circuitry WC1 is configured to be in the second state S12 in a state where the additional electric device ED3 is electrically connected to the electric device ED1 via the electric cable CB1 and where the additional electronic controller circuitry EC3 is in the second state S32 since the additional electric device ED3 supplies electricity to the electric device ED1 in the second state S32.

Thus, the electronic controller circuitry EC1 is configured to change the state of the electronic controller circuitry EC1 between the OFF state S10 and the second state S12 based on the sensed output voltage V1 sensed by the charging circuit ED33. The electronic controller circuitry EC1 is configured to change state of the first communicator circuitry WC1 from the OFF state S10 to the second state S12 in the case where the sensed output voltage V1 is equal to or higher than the voltage threshold THV. The electronic controller circuitry EC1 is configured to change state of the first communicator circuitry WC1 from the second state S12 to the OFF state S10 in the case where the sensed output voltage V1 is lower than the voltage threshold THV in the second state S12.

The electronic controller circuitry EC1 is configured to change state of the first communicator circuitry WC1 between the OFF state S10 and the first state S11 based on the sensed output voltage V1 sensed by the charging circuit ED33. The electronic controller circuitry EC1 is configured to change state of the first communicator circuitry WC1 from the first state S11 to the OFF state S10 in the case where the sensed output voltage V1 is lower than the voltage threshold THV in the first state S11.

As seen in FIG. 11, the first communicator circuitry WC1 is configured to monitor, at a first interval T1 in the first state S11, the signal SG transmitted from the second communicator circuitry WC2 of the second electric device ED2. The first wireless communicator circuitry WC11 is configured to monitor, at the first interval T1 in the first state S11, the signal SG transmitted from the second communicator circuitry WC2 of the second electric device ED2.

The first wireless communicator circuitry WC11 has a third state S13 and a fourth state S14. The first wireless communicator circuitry WC11 is configured to monitor the signal SG in the third state S13. The first wireless communicator circuitry WC11 is configured to recognize the signal SG in the third state S13 in a case where the second wireless communicator circuitry WC21 wirelessly transmit the signal SG. The first wireless communicator circuitry WC11 is configured to ignore the signal SG or to be free of responding the signal SG in the fourth state S14. The first wireless communicator circuitry WC11 is configured not to respond the signal SG in the fourth state S14 in a case where the second wireless communicator circuitry WC21 wirelessly transmit the signal SG. The third state S13 and the fourth state S14 are repeated at the first interval T1 in the first state S11. The third state S13 and the fourth state S14 are repeated at the second interval T2 in the second state S12.

The third state S13 has a third period T3. The fourth state S14 has a fourth period T4. In the present embodiment, the fourth period T4 is equal to the third period T3. The third period T3 is shorter than the first interval T1. The fourth period T4 is shorter than the second interval T2. However, the fourth period T4 can be different from the third period T3 if needed or desired. The third period T3 can be equal to or longer than the first interval T1 if needed or desired. The fourth period T4 can be equal to or longer than the second interval T2 if needed or desired.

Figure 13:
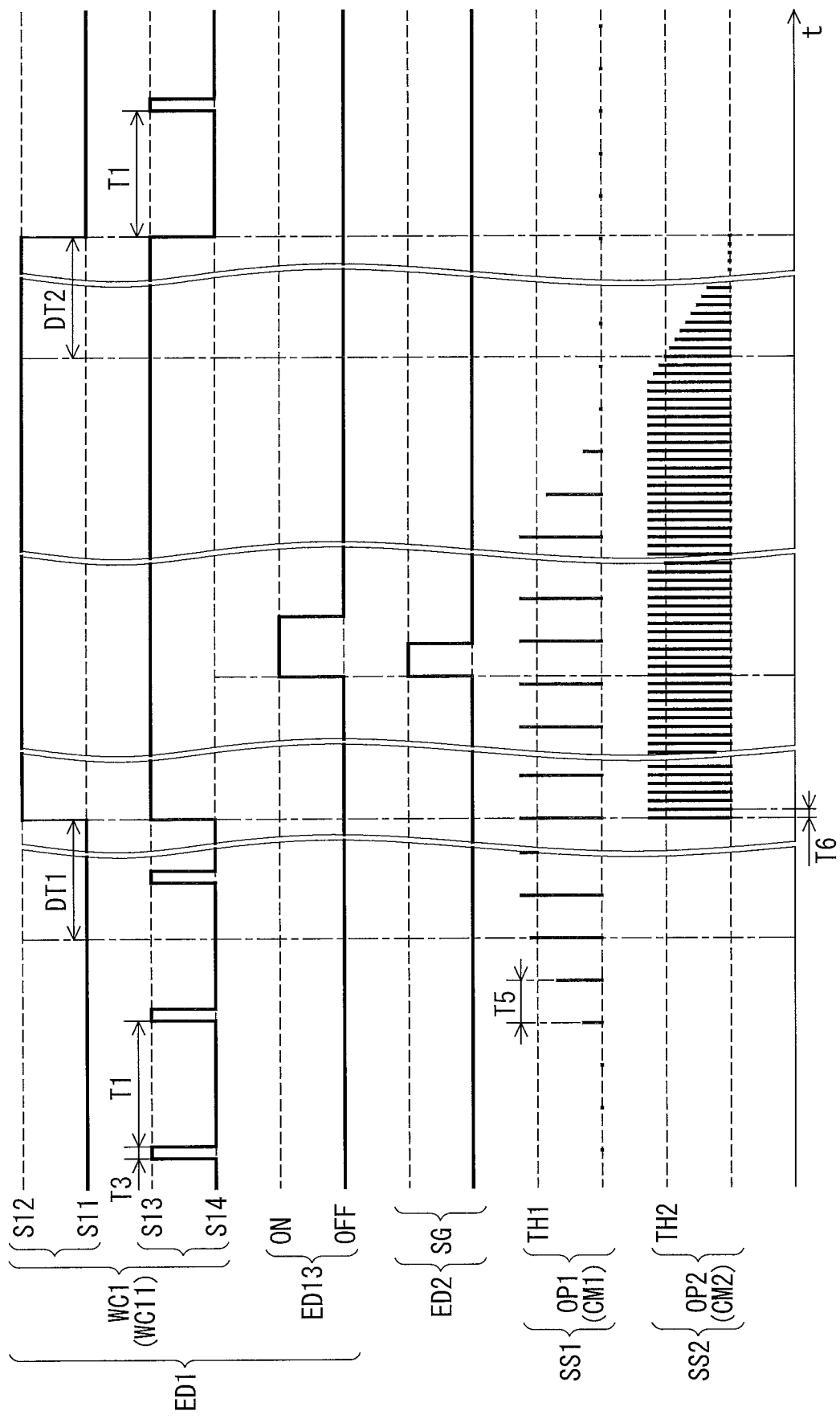
FIG. 13 is a time chart showing control of a control system in accordance with a modification.

The first communicator circuitry WC1 is configured to monitor, at a second interval T2 in the second state S12, the signal SG transmitted from the second communicator circuitry WC2 of the second electric device ED2. The second interval T2 is shorter than the first interval T1. Thus, the first power consumption is lower than the second power consumption. However, the first communicator circuitry WC1 can be configured to stop monitoring the signal SG transmitted from the second communicator circuitry WC2 of the second electric device ED2 in the first state S11 if needed or desired. As seen in FIG. 13, the first communicator circuitry WC1 can be configured to continuously monitor in the second state S12, the signal SG transmitted from the second communicator circuitry WC2 of the second electric device ED2 if needed or desired.

As seen in FIGS. 11 and 12, the first electronic controller circuitry EC1 is configured to change the state of the first communicator circuitry WC1 from the first state S11 to the second state S12 based on the first output OP1 of the first sensor SS1. The first electronic controller circuitry EC1 is configured to change the state of the first wireless communicator circuitry WC11 from the first state S11 to the second state S12 based on the first output OP1 of the first sensor SS1.

The first electronic controller circuitry EC1 is configured to change the state of the first communicator circuitry WC1 from the second state S12 to the first state S11 based on the second output OP2 of the second sensor SS2. The first electronic controller circuitry EC1 is configured to change the state of the first wireless communicator circuitry WC11 from the second state S12 to the first state S11 based on the second output OP2 of the second sensor SS2.

The first electronic controller circuitry EC1 is configured to change the state of the first communicator circuitry WC1 from the first state S11 to the second state S12 in response to the first command CM1. The first electronic controller circuitry EC1 is configured to change the state of the first wireless communicator circuitry WC11 from the first state S11 to the second state S12 in response to the first command CM1.

The first electronic controller circuitry EC1 is configured to change the state of the first communicator circuitry WC1 from the second state S12 to the first state S11 in response to the second command CM2. The first electronic controller circuitry EC1 is configured to change the state of the first wireless communicator circuitry WC11 from the second state S12 to the first state S11 in response to the second command CM2.

The first electronic controller circuitry EC1 is configured to change the state of the first communicator circuitry WC1 from the first state S11 to the second state S12 based on the first output OP1 relating to the traveling state of the human-powered vehicle 10. The first electronic controller circuitry EC1 is configured to change the state of the first wireless communicator circuitry WC11 from the first state S11 to the second state S12 based on the first output OP1 relating to the traveling state of the human-powered vehicle 10.

The first electronic controller circuitry EC1 is configured to change the state of the first communicator circuitry WC1 from the second state S12 to the first state S11 based on the second output OP2 relating to the traveling state of the human-powered vehicle 10. The first electronic controller circuitry EC1 is configured to change the state of the first wireless communicator circuitry WC11 from the second state S12 to the first state S11 based on the second output OP2 relating to the traveling state of the human-powered vehicle 10.

The first electronic controller circuitry EC1 is configured to change the state of the first communicator circuitry WC1 from the first state S11 to the second state S12 in response to the first command CM1 relating to the traveling state of the human-powered vehicle 10. The first electronic controller circuitry EC1 is configured to change the state of the first wireless communicator circuitry WC11 from the first state S11 to the second state S12 in response to the first command CM1 relating to the traveling state of the human-powered vehicle 10.

The first electronic controller circuitry EC1 is configured to change the state of the first communicator circuitry WC1 from the second state S12 to the first state S11 in response to the second command CM2 relating to the traveling state of the human-powered vehicle 10. The first electronic controller circuitry EC1 is configured to change the state of the first wireless communicator circuitry WC11 from the second state S12 to the first state S11 in response to the second command CM2 relating to the traveling state of the human-powered vehicle 10.

As seen in FIG. 12, the first electronic controller circuitry EC1 is configured to be turned on and to enter a wake state S21 in response to supply of electricity from the additional electric device ED3. The first electronic controller circuitry EC1 is configured to change the state of the first wireless communicator circuitry WC11 between the first state S11 and the second state S12 in the wake state S21. The first electronic controller circuitry EC1 can be configured to be continuously in the wake state S21 or to enter a sleep state S22 after the first electronic controller circuitry EC1 changes the state of the first wireless communicator circuitry WC11 from the OFF state S10 to the second state S12 in the wake state S21. The first electronic controller circuitry EC1 can be configured to change the state of the first electronic controller circuitry EC1 from the sleep state S22 to the wake state S21 in a case where the first wireless communicator circuitry WC11 detects the signal SG.

In a state where the first wireless communicator circuitry WC11 is in the first state S11, the first electronic controller circuitry EC1 can be configured to periodically change the state of the first electronic controller circuitry EC1 between the sleep state S22 and the wake state S21 at a wake interval. The wake interval can be equal to or different from the first interval T1.

As seen in FIGS. 11 and 12, the first electronic controller circuitry EC1 is configured to change the state of the first communicator circuitry WC1 from the first state S11 to the second state S12 based on the first output OP1 relating to one of: the vibration of the human-powered vehicle 10; the pedaling torque of the crank 12 of the human-powered vehicle 10; the cadence of the human-powered vehicle 10; and the speed of the human-powered vehicle 10. The first electronic controller circuitry EC1 is configured to change the state of the first wireless communicator circuitry WC11 from the first state S11 to the second state S12 based on the first output OP1 relating to one of: the vibration of the human-powered vehicle 10; the pedaling torque of the crank 12 of the human-powered vehicle 10; the cadence of the human-powered vehicle 10; and the speed of the human-powered vehicle 10.

The first electronic controller circuitry EC1 is configured to change the state of the first communicator circuitry WC1 from the second state S12 to the first state S11 based on the second output OP2 relating to another of: the vibration of the human-powered vehicle 10; the pedaling torque of the crank 12 of the human-powered vehicle 10; the cadence of the human-powered vehicle 10; and the speed of the human-powered vehicle 10. The first electronic controller circuitry EC1 is configured to change the state of the first wireless communicator circuitry WC11 from the second state S12 to the first state S11 based on the second output OP2 relating to another of: the vibration of the human-powered vehicle 10; the pedaling torque of the crank 12 of the human-powered vehicle 10; the cadence of the human-powered vehicle 10; and the speed of the human-powered vehicle 10.

The first electronic controller circuitry EC1 is configured to change the state of the first communicator circuitry WC1 from the first state S11 to the second state S12 in response to the first command CM1 relating to one of: the vibration of the human-powered vehicle 10; the pedaling torque of the crank 12 of the human-powered vehicle 10; the cadence of the human-powered vehicle 10; and the speed of the human-powered vehicle 10. The first electronic controller circuitry EC1 is configured to change the state of the first wireless communicator circuitry WC11 from the first state S11 to the second state S12 in response to the first command CM1 relating to one of: the vibration of the human-powered vehicle 10; the pedaling torque of the crank 12 of the human-powered vehicle 10; the cadence of the human-powered vehicle 10; and the speed of the human-powered vehicle 10.

The first electronic controller circuitry EC1 is configured to change the state of the first communicator circuitry WC1 from the second state S12 to the first state S11 in response to the second command CM2 relating to another of: the vibration of the human-powered vehicle 10; the pedaling torque of the crank 12 of the human-powered vehicle 10; the cadence of the human-powered vehicle 10; and the speed of the human-powered vehicle 10. The first electronic controller circuitry EC1 is configured to change the state of the first wireless communicator circuitry WC11 from the second state S12 to the first state S11 in response to the second command CM2 relating to another of: the vibration of the human-powered vehicle 10; the pedaling torque of the crank 12 of the human-powered vehicle 10; the cadence of the human-powered vehicle 10; and the speed of the human-powered vehicle 10.

The first electronic controller circuitry EC1 is configured to change the state of the first communicator circuitry WC1 from the first state S11 to the second state S12 in a case where the first output OP1 is greater than a first threshold TH1. The first electronic controller circuitry EC1 is configured to change the state of the first wireless communicator circuitry WC11 from the first state S11 to the second state S12 in the case where the first output OP1 is greater than the first threshold TH1.

The first electronic controller circuitry EC1 is configured to change the state of the first communicator circuitry WC1 from the first state S11 to the second state S12 regardless of the second output OP2 in a case where the first output OP1 is greater than the first threshold TH1. The first electronic controller circuitry EC1 is configured to change the state of the first wireless communicator circuitry WC11 from the first state S11 to the second state S12 regardless of the second output OP2 in the case where the first output OP1 is greater than the first threshold TH1.

The first electronic controller circuitry EC1 is configured to change the state of the first communicator circuitry WC1 from the first state S11 to the second state S12 in a case where a value included in the first command CM1 is greater than the first threshold TH1. The first electronic controller circuitry EC1 is configured to change the state of the first wireless communicator circuitry WC11 from the first state S11 to the second state S12 in the case where a value included in the first command CM1 is greater than the first threshold TH1.

In the present embodiment, the first electronic controller circuitry EC1 is configured to change the state of the first communicator circuitry WC1 from the first state S11 to the second state S12 in a case where the first output OP1 is greater than the first threshold TH1 for a first determination time DT1. The first electronic controller circuitry EC1 is configured to change the state of the first wireless communicator circuitry WC11 from the first state S11 to the second state S12 in the case where the first output OP1 is greater than the first threshold TH1 for the first determination time DT1.

The first electronic controller circuitry EC1 is configured to change the state of the first communicator circuitry WC1 from the first state S11 to the second state S12 in a case where the value of the first command CM1 is greater than the first threshold TH1 for the first determination time DT1. The first electronic controller circuitry EC1 is configured to change the state of the first wireless communicator circuitry WC11 from the first state S11 to the second state S12 in the case where the value of the first command CM1 is greater than the first threshold TH1 for the first determination time DT1.

The first electronic controller circuitry EC1 is configured to change the state of the first communicator circuitry WC1 from the second state S12 to the first state S11 in a case where the second output OP2 is less than a second threshold TH2. The first electronic controller circuitry EC1 is configured to change the state of the first wireless communicator circuitry WC11 from the second state S12 to the first state S11 in the case where the second output OP2 is less than the second threshold TH2.

The first electronic controller circuitry EC1 is configured to change the state of the first communicator circuitry WC1 from the second state S12 to the first state S11 regardless of the first output OP1 in a case where the second output OP2 is less than the second threshold TH2. The first electronic controller circuitry EC1 is configured to change the state of the first wireless communicator circuitry WC11 from the second state S12 to the first state S11 regardless of the first output OP1 in the case where the second output OP2 is less than the second threshold TH2.

The first electronic controller circuitry EC1 is configured to change the state of the first communicator circuitry WC1 from the second state S12 to the first state S11 in a case where the value included in the second command CM2 is less than the second threshold TH2. The first electronic controller circuitry EC1 is configured to change the state of the first wireless communicator circuitry WC11 from the second state S12 to the first state S11 in the case where the value included in the second command CM2 is less than the second threshold TH2.

In the present embodiment, the first electronic controller circuitry EC1 is configured to change the state of the first communicator circuitry WC1 from the second state S12 to the first state S11 in a case where the second output OP2 is less than the second threshold TH2 for a second determination time DT2. The first electronic controller circuitry EC1 is configured to change the state of the first wireless communicator circuitry WC11 from the second state S12 to the first state S11 in a case where the value included in the second command CM2 is less than the second threshold TH2 for the second determination time DT2.

The first electronic controller circuitry EC1 is configured to change the state of the first communicator circuitry WC1 from the second state S12 to the first state S11 in a case where the value of the second command CM2 is greater than the second threshold TH2 for the second determination time DT2. The first electronic controller circuitry EC1 is configured to change the state of the first wireless communicator circuitry WC11 from the second state S12 to the first state S11 in a case where the value of the second command CM2 is greater than the second threshold TH2 for the second determination time DT2.

In the present embodiment, the first determination time DT1 is longer than zero. The second determination time DT2 is longer than zero. The second determination time DT2 is different from the first determination time DT1. The second determination time DT2 is longer than the first determination time DT1. However, the first determination time DT1 can be zero if needed or desired. The second determination time DT2 can be zero if needed or desired.

The second determination time DT2 can be equal to or shorter than the first determination time DT1 if needed or desired.

The first electronic controller circuitry EC1 is configured to control the electric actuator ED13 to generate the actuation force in a case where the first communicator circuitry WC1 detects the signal SG in the second state S12. The first electronic controller circuitry EC1 is configured to control the electric actuator ED13 to generate the actuation force in a case where the first wireless communicator circuitry WC11 detects the signal SG in the second state S12.

As seen in FIGS. 11 and 12, the additional electronic controller circuitry EC3 is configured to change the state of the additional electronic controller circuitry EC3 from the first state S31 to the second state S32 in a case where the first electronic controller circuitry EC1 changes the state of the first communicator circuitry WC1 from the first state S11 to the second state S12. The additional electronic controller circuitry EC3 is configured to change the state of the additional electronic controller circuitry EC3 from the second state S32 to the first state S31 in a case where the first electronic controller circuitry EC1 changes the state of the first communicator circuitry WC1 from the second state S12 to the first state S11.

For example, the additional electronic controller circuitry EC3 is configured to change the state of the additional electronic controller circuitry EC3 from the first state S31 to the second state S32 in the case where the first output OP1 is greater than the first threshold TH1. The additional electronic controller circuitry EC3 is configured to change the state of the additional electronic controller circuitry EC3 from the second state S32 to the first state S31 in the case where the second output OP2 is less than the second threshold TH2.

Figure 14:
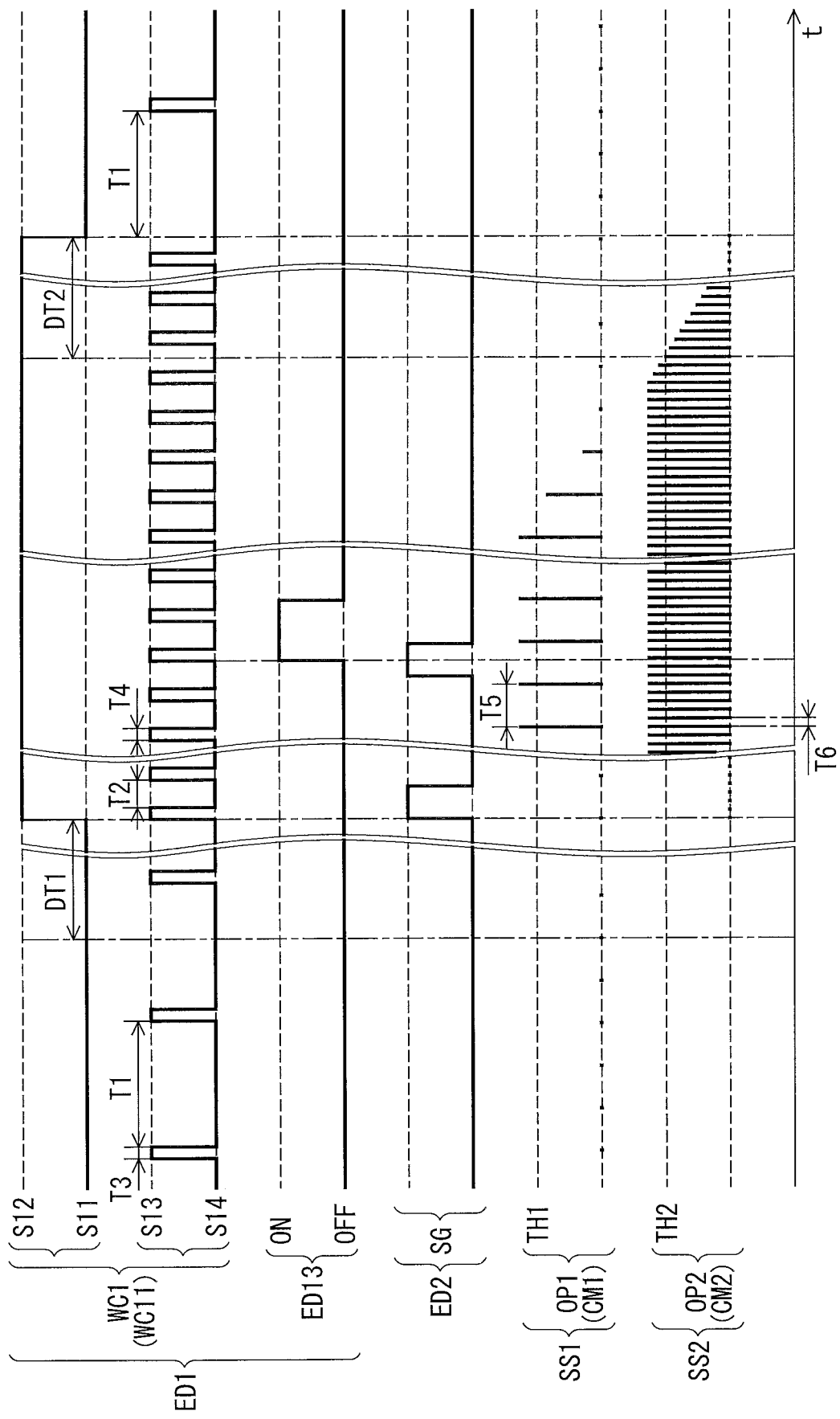
FIG. 14 is a time chart showing control of a control system in accordance with another modification.

As seen in FIG. 14, the first electronic controller circuitry EC1 is configured to change the state of the first communicator circuitry WC1 from the first state S11 to the second state S12 in a case where the first communicator circuitry WC1 detects the signal SG in the first state S11. The first electronic controller circuitry EC1 is configured to change the state of the first communicator circuitry WC1 from the first state S11 to the second state S12 in a case where the first wireless communicator circuitry WC11 detects the signal SG in the first state S11.

Figure 15:
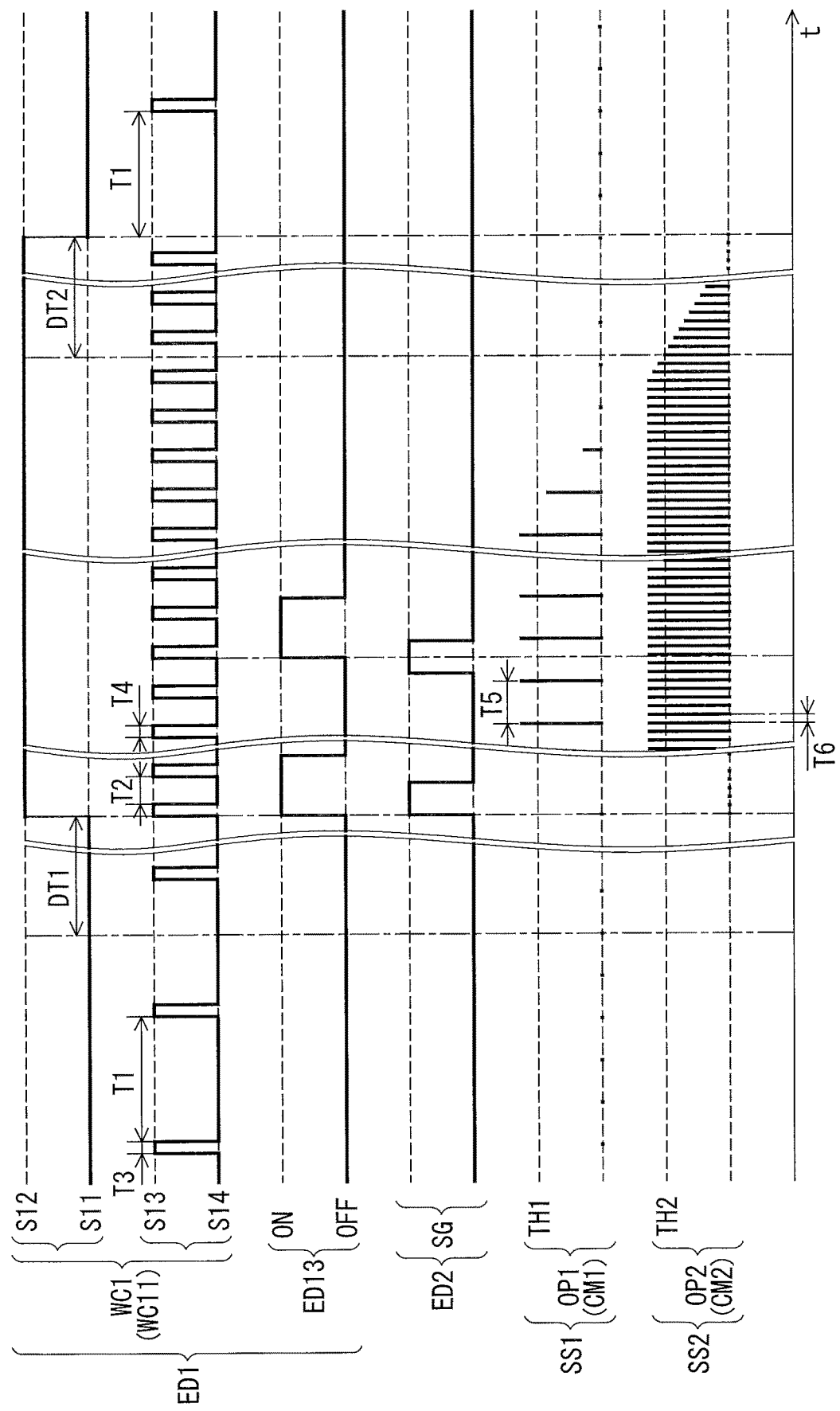
FIG. 15 is a time chart showing control of a control system in accordance with another modification.

In the present embodiment, the first electronic controller circuitry EC1 is configured to be free of controlling the electric actuator ED13 to generate the actuation force in the case where the first wireless communicator circuitry WC11 detects the signal SG in the first state S11. The first electronic controller circuitry EC1 is configured to be free of controlling the electric actuator ED13 to generate the actuation force in the case where the first wireless communicator circuitry WC11 detects the signal SG in the first state S11. As seen in FIG. 15, however, the first electronic controller circuitry EC1 can be configured to change the state of the first wireless communicator circuitry WC11 from the first state S11 to the second state S12 and to control the electric actuator ED13 to generate the actuation force in the case where the first wireless communicator circuitry WC11 detects the signal SG in the first state S11 if needed or desired. Namely, the first electronic controller circuitry EC1 can be configured to change the state of the first communicator circuitry WC1 from the first state S11 to the second state S12 in at least one of the case where the first output OP1 is greater than the first threshold TH1 and the case where the first wireless communicator circuitry WC11 detects the signal SG in the first state S11.

In the above embodiments and the modifications thereof, the electric device ED1 corresponds to the electric device RD, the second electric device ED2 corresponds to the electric device ST3, and the additional electric device ED3 corresponds to the electric device HA. However, the electric device ED1 can correspond to one of the electric devices FS, RS, RD, DU, FB, RB, AS, HA, and SP if needed or desired. The additional electric device ED3 can correspond to another of the electric devices FS, RS, RD, DU, FB, RB, AS, HA, and SP if needed or desired. The second electric device ED2 can correspond to one of the electric devices ST1, ST2, ST3, ST4, ST5, ST6, and ST7 if needed or desired.

In the above embodiments and the modifications thereof, as seen in FIG. 6, the first command CM1 is indicative of the first output OP1. The second command CM2 is indicative of the second output OP2. The first electronic controller circuitry EC1 is configured to determine whether the state of the first communicator circuitry WC1 is changed from the first state S11 to the second state S12 based on the first command CM1. The first electronic controller circuitry EC1 is configured to determine whether the state of the first communicator circuitry WC1 is changed from the second state S12 to the first state S11 based on the second command CM2. However, the additional electronic controller circuitry EC3 can be configured to determine whether the state of the first communicator circuitry WC1 is changed from the first state S11 to the second state S12 based on the first output OP1 if needed or desired. The additional electronic controller circuitry EC3 can be configured to determine whether the state of the first communicator circuitry WC1 is changed from the second state S12 to the first state S11 based on the second output OP2 if needed or desired. In such modifications, the additional electronic controller circuitry EC3 is configured to generate the first command CM1 in the case where the first output OP1 is greater than the first threshold TH1. The additional electronic controller circuitry EC3 is configured to generate the second command CM2 in the case where the second output OP2 is less than the second threshold TH2. The first communicator circuitry WC1 is configured to change the state of the first communicator circuitry WC1 from the first state S11 to the second state S12 in response to the first command CM1 without determining whether the first command CM1 is greater than the first threshold TH1. The first communicator circuitry WC1 is configured to change the state of the first communicator circuitry WC1 from the second state S12 to the first state S11 in response to the second command CM2 without determining whether the second command CM2 is less than the second threshold TH2.

Figure 16:
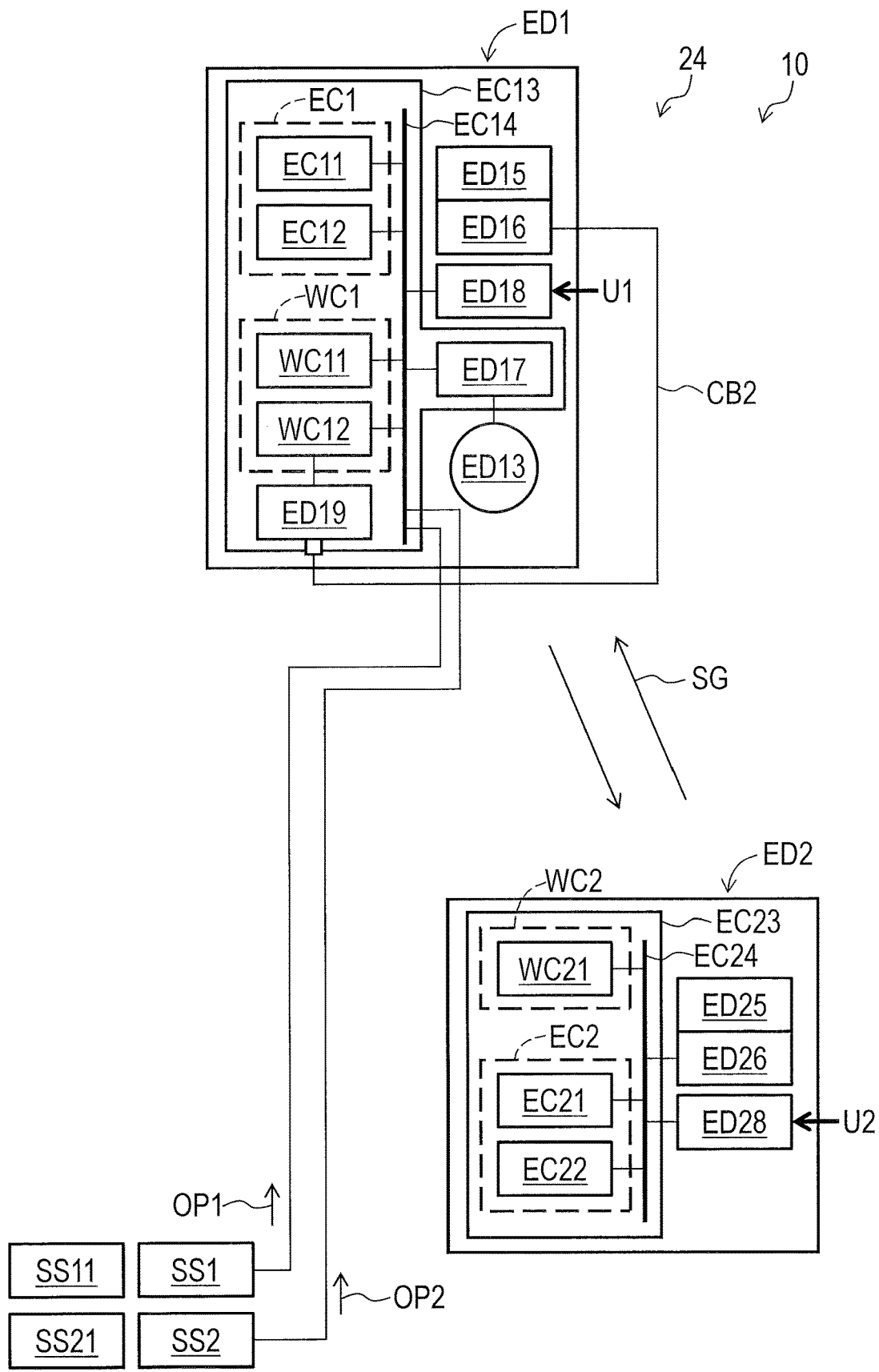
FIG. 16 is a schematic block diagram of a control system of a human-powered vehicle in accordance with a modification.
Figure 17:
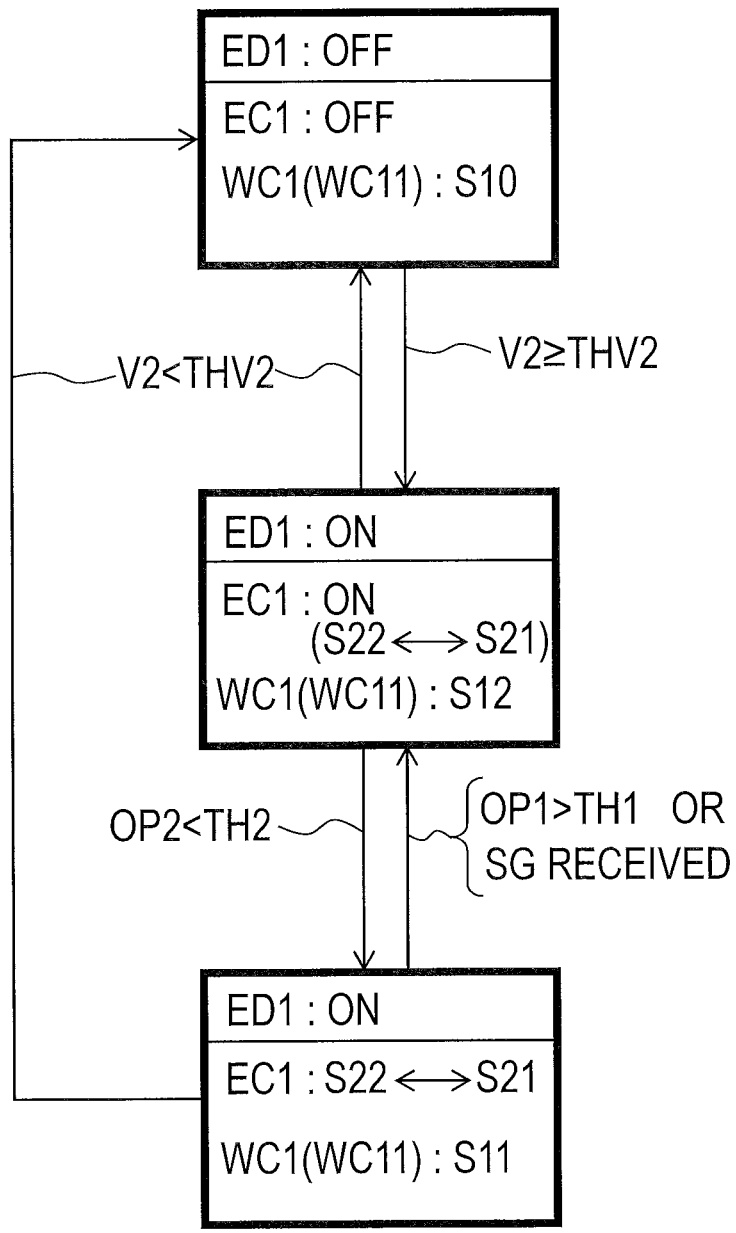
FIG. 17 is a schematic diagram showing control of the control system illustrated in FIG. 16.

In the above embodiments and the modifications thereof, as seen in FIG. 6, the first sensor SS1 and the second sensor SS2 are electrically connected to the electric device ED1 via the additional electric device ED3. As seen in FIG. 16, however, the additional electric device ED3 can be omitted from the electric system 24, and at least one of the first sensor SS1 and the second sensor SS2 can be directly connected to the electric device ED1 if needed or desired. In such modifications, the first electronic controller circuitry EC1 is configured to change the state of the first communicator circuitry WC1 from the first state S11 to the second state S12 based on the first output OP1. The first electronic controller circuitry EC1 is configured to change the state of the first communicator circuitry WC1 from the second state S12 to the first state S11 based on the second output OP2. As seen in FIG. 17, the first electronic controller circuitry EC1 is configured to change the state of the first electronic controller circuitry EC1 from the OFF state S10 to the second state S12 in a case where an output voltage V2 of the electric power source ED15 is equal to or higher than a voltage threshold THV2. The first electronic controller circuitry EC1 is configured to change the state of the first electronic controller circuitry EC1 from the second state S12 to the OFF state S10 in a case where the output voltage V2 is lower than the voltage threshold THV2 in the second state S12. The first electronic controller circuitry EC1 is configured to be turned off in response to an operation of the user interface ED18 or another user interface such as a power switch.

In the above embodiments and the modifications thereof, the first electronic controller circuitry EC1 can be configured to calculate a value indicative of the traveling state of the human-powered vehicle 2 based on the first output OP1 if needed or desired. The first electronic controller circuitry EC1 can be configured to calculate a value indicative of the traveling state of the human-powered vehicle 2 based on the second output OP2 if needed or desired. The first electronic controller circuitry EC1 can be configured to calculate one of: the vibration of the human-powered vehicle 10; the pedaling torque of the crank 12 of the human-powered vehicle 10; the cadence of the human-powered vehicle 10; and the speed of the human-powered vehicle 10 based on the first output OP1 of the first sensor SS1. The first electronic controller circuitry EC1 can be configured to calculate another of: the vibration of the human-powered vehicle 10; the pedaling torque of the crank 12 of the human-powered vehicle 10; the cadence of the human-powered vehicle 10; and the speed of the human-powered vehicle 10 based on the second output OP2 of the second sensor SS2. In such modifications, the first electronic controller circuitry EC1 is configured to change the state of the first communicator circuitry WC1 from the first state S11 to the second state S12 based on the value which is calculated by the first electronic controller circuitry EC1 using the first output OP1. The first electronic controller circuitry EC1 is configured to change the state of the first communicator circuitry WC1 from the second state S12 to the first state S11 based on the value which is calculated by the first electronic controller circuitry EC1 using the second output OP2.

The structure of the electric device ED1 can be applied to an electric device other than the electric devices FS, RS, RD, DU, FB, RB, AS, HA, and SP if needed or desired. The structure of the second electric device ED2 can be applied to an electric device other than the electric devices ST1, ST2, ST3, ST4, ST5, ST6, and ST7 if needed or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electric device of a human-powered vehicle, the electric device comprising:
   first communicator circuitry configured to receive a signal from second communicator circuitry of a second electric device;
   first electronic controller circuitry configured to change a state of the first communicator circuitry from a first state to a second state based on a first output of a first sensor configured to sense a first sensor object, the first state having first power consumption, the second state having second power consumption, the first power consumption being lower than the second power consumption; and
   the first electronic controller circuitry being configured to change the state of the first communicator circuitry from the second state to the first state based on a second output of a second sensor configured to sense a second sensor object different from the first sensor object.

2. The electric device according to claim 1, wherein the first electronic controller circuitry is configured to change the state of the first communicator circuitry from the first state to the second state based on the first output relating to a traveling state of the human-powered vehicle.

3. The electric device according to claim 1, wherein the first electronic controller circuitry is configured to change the state of the first communicator circuitry from the second state to the first state based on the second output relating to a traveling state of the human-powered vehicle.

4. The electric device according to claim 1, wherein
the first electronic controller circuitry is configured to change the state of the first communicator circuitry from the first state to the second state based on the first output relating to one of:
vibration of the human-powered vehicle;
pedaling torque of a crank of the human-powered vehicle;
cadence of the human-powered vehicle; and
a speed of the human-powered vehicle.

5. The electric device according to claim 4, wherein
the first electronic controller circuitry is configured to change the state of the first communicator circuitry from the second state to the first state based on the second output relating to another of:
the vibration of the human-powered vehicle;
the pedaling torque of the crank of the human-powered vehicle;
the cadence of the human-powered vehicle; and
the speed of the human-powered vehicle.

6. The electric device according to claim 1, wherein
the first electronic controller circuitry is configured to change the state of the first communicator circuitry from the first state to the second state in a case where the first output is greater than a first threshold.

7. The electric device according to claim 1, wherein
the first electronic controller circuitry is configured to change the state of the first communicator circuitry from the second state to the first state in a case where the second output is less than a second threshold.

8. The electric device according to claim 7, wherein
the first electronic controller circuitry is configured to change the state of the first communicator circuitry from the second state to the first state in a case where the second output is less than the second threshold for a second determination time.

9. The electric device according to claim 1, wherein
the first communicator circuitry is configured to monitor, at a first interval in the first state, the signal transmitted from the second communicator circuitry of the second electric device.

10. The electric device according to claim 9, wherein
the first communicator circuitry is configured to monitor, at a second interval in the second state, the signal transmitted from the second communicator circuitry of the second electric device, and
the second interval is shorter than the first interval.

11. The electric device according to claim 9, wherein
the first communicator circuitry is configured to continuously monitor in the second state, the signal transmitted from the second communicator circuitry of the second electric device.

12. The electric device according to claim 1, further comprising
an electric actuator configured to generate an actuation force, wherein
the first electronic controller circuitry is configured to control the electric actuator to generate the actuation force in a case where the first communicator circuitry detects the signal in the second state.

13. The electric device according to claim 1, wherein
the first electronic controller circuitry is configured to change the state of the first communicator circuitry from the first state to the second state in a case where the first communicator circuitry detects the signal in the first state.

14. The electric device according to claim 1, wherein
the first electronic controller circuitry is configured to receive electricity from an electric power generator configured to generate electricity.

15. The electric device according to claim 1, wherein
the first electronic controller circuitry is configured to receive electricity from an electric power storage configured to store electricity.

16. The electric device according to claim 1, wherein
the first electronic controller circuitry is configured to be electrically connected to an additional electronic controller circuitry, and
the first electronic controller circuitry is configured to change the state of the first communicator circuitry based on a command generated by the additional electronic controller circuitry.

17. The electric device according to claim 16, wherein
the additional electronic controller circuitry is configured to generate a first command in response to the first output of the first sensor,
the first electronic controller circuitry is configured to change the state of the first communicator circuitry from the first state to the second state in response to the first command, the additional electronic controller circuitry is configured to generate a second command in response to the second output of the second sensor, and
the first electronic controller circuitry is configured to change the state of the first communicator circuitry from the second state to the first state in response to the second command.

18. An electric system of a human-powered vehicle, the electric system comprising:
the electric device according to claim 1;
an additional electric device configured to be electrically connected to the first electronic controller circuitry of the electric device; and
the first electronic controller circuitry being configured to change the state of the first communicator circuitry based on a command generated by the additional electric device.

19. The electric system according to claim 18, further comprising:
the first sensor; and
the second sensor.

20. The electric system according to claim 18, wherein
the additional electric device is separately provided from the electric device, and
the first electronic controller circuitry is configured to be electrically connected to the additional electric device via an electric cable.

* * * * *